United States Patent
Allen et al.

(10) Patent No.: US 11,588,825 B2
(45) Date of Patent: *Feb. 21, 2023

(54) GEO-FENCE AUTHORIZATION PROVISIONING

(71) Applicant: Snap Inc., Santa Monica, CA (US)

(72) Inventors: Nicholas Richard Allen, Venice, CA (US); Sheldon Chang, Venice, CA (US)

(73) Assignee: Snap Inc., Santa Monica, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/035,575

(22) Filed: Sep. 28, 2020

(65) Prior Publication Data
US 2021/0014238 A1 Jan. 14, 2021

Related U.S. Application Data

(63) Continuation of application No. 16/541,919, filed on Aug. 15, 2019, now Pat. No. 10,893,055, which is a
(Continued)

(51) Int. Cl.
*H04L 9/40* (2022.01)
*H04W 4/029* (2018.01)
(Continued)

(52) U.S. Cl.
CPC .......... *H04L 63/107* (2013.01); *H04L 51/222* (2022.05); *H04L 51/52* (2022.05);
(Continued)

(58) Field of Classification Search
CPC ..... H04L 63/107; H04L 51/222; H04L 51/52; H04L 63/0876; H04W 4/021;
(Continued)

(56) References Cited

U.S. PATENT DOCUMENTS 6,587,118 B1 7/2003 Yoneda
6,922,634 B2 7/2005 Odakura et al.
(Continued)

FOREIGN PATENT DOCUMENTS

CN 1879071 A 12/2006
CN 101981987 A 2/2011
(Continued)

OTHER PUBLICATIONS

US 10,542,011 B2, 01/2020, Allen et al. (withdrawn)
(Continued)

*Primary Examiner* — Abiy Getachew
(74) *Attorney, Agent, or Firm* — Schwegman Lundberg & Woessner, P.A.

(57) ABSTRACT

A system includes a communication module that receives a request to post content to an event gallery associated with an event. The request in turn includes geo-location data for a device sending the content, and identification data identifying the device or a user of the device. The system further has an event gallery module to perform a first authorization operation that includes determining that the geo-location data corresponds to a geo-location fence associated with an event. The event gallery module also performs a second authorization operation that includes using the identification data to verify an attribute of the user. Finally, based on the first and second authorization operations, the event gallery module may selectively authorize the device to post the content to the event gallery.

20 Claims, 10 Drawing Sheets

Related U.S. Application Data continuation of application No. 15/074,029, filed on Mar. 18, 2016, now Pat. No. 10,616,239.

(60) Provisional application No. 62/134,689, filed on Mar. 18, 2015.

(51) Int. Cl.

| | | |
|---|---|---|
| *H04W 12/06* | (2021.01) | |
| *H04W 4/02* | (2018.01) | |
| *H04W 4/18* | (2009.01) | |
| *H04W 4/021* | (2018.01) | |
| *H04W 12/64* | (2021.01) | |
| *H04L 51/52* | (2022.01) | |
| *H04L 51/222* | (2022.01) | |
| *H04W 12/63* | (2021.01) | |

(52) U.S. Cl.
CPC ......... *H04L 63/0876* (2013.01); *H04W 4/021* (2013.01); *H04W 4/023* (2013.01); *H04W 4/029* (2018.02); *H04W 4/185* (2013.01); *H04W 12/06* (2013.01); *H04W 12/64* (2021.01); *H04W 12/63* (2021.01)

(58) Field of Classification Search
CPC ..... H04W 4/023; H04W 4/029; H04W 4/185; H04W 12/06; H04W 12/64; H04W 12/63
See application file for complete search history.

(56) References Cited

U.S. PATENT DOCUMENTS

| | | |
|---|---|---|
| 7,254,585 B2 | 8/2007 | Frieden et al. |
| 7,496,567 B1 | 2/2009 | Steichen |
| 7,971,156 B2 | 6/2011 | Albertson et al. |
| 7,996,793 B2 | 8/2011 | Latta et al. |
| 8,063,797 B1 | 11/2011 | Sonnabend et al. |
| 8,073,947 B1 | 12/2011 | Yeh et al. |
| 8,127,035 B1 | 2/2012 | Hood et al. |
| 8,347,021 B1 | 1/2013 | Phillips et al. |
| 8,352,494 B1 | 1/2013 | Badoiu |
| 8,433,296 B2 | 4/2013 | Hardin et al. |
| 8,487,938 B2 | 7/2013 | Latta et al. |
| 8,559,980 B2 | 10/2013 | Pujol |
| 8,626,187 B2 | 1/2014 | Grosman et al. |
| 8,639,648 B2 | 1/2014 | Koponen et al. |
| 8,649,803 B1 | 2/2014 | Hamill |
| 8,666,152 B1 | 3/2014 | Ramanathan et al. |
| 8,688,519 B1 | 4/2014 | Lin et al. |
| 8,856,691 B2 | 10/2014 | Geisner et al. |
| 8,923,823 B1 | 12/2014 | Wilde |
| 8,943,140 B1 | 1/2015 | Kothari |
| 9,043,329 B1 | 5/2015 | Patton et al. |
| 9,230,160 B1 | 1/2016 | Kanter |
| 9,269,011 B1 | 2/2016 | Sikka et al. |
| 9,641,572 B1 | 5/2017 | Yeskel et al. |
| 9,645,221 B1 | 5/2017 | Heizer |
| 9,706,355 B1 | 7/2017 | Cali et al. |
| 9,866,999 B1 | 1/2018 | Noeth |
| 9,894,478 B1 | 2/2018 | Deluca et al. |
| 10,026,226 B1 | 7/2018 | Lotto |
| 10,102,423 B2 | 10/2018 | Shaburov et al. |
| 10,176,195 B2 | 1/2019 | Patel |
| 10,282,753 B2 | 5/2019 | Cheung |
| 10,285,002 B2 | 5/2019 | Colonna et al. |
| 10,285,006 B2 | 5/2019 | Colonna et al. |
| 10,289,287 B2 | 5/2019 | Rathod |
| 10,395,519 B2 | 8/2019 | Colonna et al. |
| 10,438,094 B1 | 10/2019 | Ko et al. |
| 10,439,972 B1 | 10/2019 | Spiegel et al. |
| 10,440,420 B2 | 10/2019 | Hogeg et al. |
| 10,445,777 B2 | 10/2019 | McDevitt et al. |
| 10,509,466 B1 | 12/2019 | Miller et al. |
| 10,581,782 B2 | 3/2020 | Tang |
| 10,582,277 B2 | 3/2020 | Tang |
| 10,614,855 B2 | 4/2020 | Huang |
| 10,616,476 B1 | 4/2020 | Ebsen et al. |
| 10,694,317 B2 | 6/2020 | Cheung |
| 10,748,347 B1 | 8/2020 | Li et al. |
| 10,779,113 B2 | 9/2020 | Sehn et al. |
| 10,811,053 B2 | 10/2020 | Sehn |
| 10,893,055 B2 | 1/2021 | Allen et al. |
| 10,944,710 B1 | 3/2021 | Allen et al. |
| 10,958,608 B1 | 3/2021 | Allen et al. |
| 10,962,809 B1 | 3/2021 | Castaneda |
| 10,990,697 B2 | 4/2021 | Murphy et al. |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,012,398 B1 | 5/2021 | Allen et al. |
| 11,030,454 B1 | 6/2021 | Xiong et al. |
| 11,036,368 B1 | 6/2021 | Al Majid et al. |
| 11,038,829 B1 | 6/2021 | Allen et al. |
| 11,062,498 B1 | 7/2021 | Voss et al. |
| 11,087,728 B1 | 8/2021 | Canberk et al. |
| 11,092,998 B1 | 8/2021 | Castaneda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,166,121 B2 | 11/2021 | Sehn et al. |
| 11,169,600 B1 | 11/2021 | Canberk et al. |
| 11,216,869 B2 | 1/2022 | Allen et al. |
| 11,227,626 B1 | 1/2022 | Krishnan Gorumkonda et al. |
| 11,249,617 B1 | 2/2022 | Allen et al. |
| 11,250,887 B2 | 2/2022 | Sehn |
| 11,317,240 B2 | 4/2022 | Allen et al. |
| 11,372,608 B2 | 6/2022 | Sehn |
| 11,411,908 B1 | 8/2022 | Allen et al. |
| 2002/0047686 A1 | 4/2002 | Kodama et al. |
| 2002/0047858 A1 | 4/2002 | Bayliss et al. |
| 2002/0141378 A1 | 10/2002 | Bays et al. |
| 2002/0146103 A1 | 10/2002 | Holt et al. |
| 2003/0236823 A1 | 12/2003 | Patzer et al. |
| 2004/0059796 A1 | 3/2004 | McLintock |
| 2004/0091116 A1 | 5/2004 | Staddon et al. |
| 2005/0024941 A1 | 2/2005 | Lasser et al. |
| 2005/0032527 A1 | 2/2005 | Sheha et al. |
| 2006/0242550 A1 | 10/2006 | Rahman et al. |
| 2006/0282819 A1 | 12/2006 | Graham et al. |
| 2007/0067317 A1 | 3/2007 | Stevenson |
| 2007/0088832 A1 | 4/2007 | Tsang et al. |
| 2007/0118801 A1 | 5/2007 | Harshbarger et al. |
| 2007/0294735 A1 | 12/2007 | Luo |
| 2008/0046831 A1 | 2/2008 | Imai et al. |
| 2008/0091723 A1 | 4/2008 | Zuckerberg et al. |
| 2008/0133336 A1 | 6/2008 | Altman et al. |
| 2008/0172413 A1 | 7/2008 | Chiu |
| 2008/0183485 A1 | 7/2008 | Drabble et al. |
| 2008/0200189 A1 | 8/2008 | Lagerstedt et al. |
| 2008/0244438 A1 | 10/2008 | Peters et al. |
| 2008/0256450 A1 | 10/2008 | Takakura et al. |
| 2009/0012788 A1 | 1/2009 | Gilbert |
| 2009/0087161 A1 | 4/2009 | Roberts et al. |
| 2009/0132687 A1 | 5/2009 | Yue et al. |
| 2009/0158183 A1 | 6/2009 | Mccurdy et al. |
| 2009/0291665 A1 | 11/2009 | Gaskarth et al. |
| 2009/0300139 A1 | 12/2009 | Shoemaker et al. |
| 2010/0113066 A1 | 5/2010 | Dingier et al. |
| 2010/0185750 A1 | 7/2010 | Nakayama |
| 2010/0247064 A1 | 9/2010 | Yeh et al. |
| 2010/0299763 A1 | 11/2010 | Marcus et al. |
| 2011/0093444 A1 | 4/2011 | Rose et al. |
| 2011/0099519 A1 | 4/2011 | Ma et al. |
| 2011/0106882 A1 | 5/2011 | Takakura et al. |
| 2011/0137782 A1 | 6/2011 | Fang |
| 2011/0161423 A1 | 6/2011 | Pratt et al. |
| 2011/0238762 A1 | 9/2011 | Soni et al. |
| 2011/0249551 A1 | 10/2011 | Rollins |
| 2011/0258260 A1 | 10/2011 | Isaacson |
| 2011/0269479 A1 | 11/2011 | Ledlie |
| 2011/0283172 A1 | 11/2011 | Berger et al. |
| 2011/0295577 A1 | 12/2011 | Ramachandran |
| 2011/0295719 A1 | 12/2011 | Chen et al. |

(56) References Cited

U.S. PATENT DOCUMENTS

| | | |
|---|---|---|
| 2011/0301934 A1 | 12/2011 | Tardif |
| 2011/0302525 A1 | 12/2011 | Jeon |
| 2012/0030194 A1 | 2/2012 | Jain |
| 2012/0098836 A1 | 4/2012 | Kim et al. |
| 2012/0124147 A1 | 5/2012 | Hamlin et al. |
| 2012/0158814 A1 | 6/2012 | Sabiwalsky |
| 2012/0226663 A1 | 9/2012 | Valdez et al. |
| 2012/0324018 A1* | 12/2012 | Metcalf ............... G06Q 50/01 709/206 |
| 2013/0017802 A1 | 1/2013 | Adibi et al. |
| 2013/0018960 A1 | 1/2013 | Knysz et al. |
| 2013/0024292 A1 | 1/2013 | David |
| 2013/0117261 A1 | 5/2013 | Sambrani |
| 2013/0117365 A1 | 5/2013 | Padmanabhan et al. |
| 2013/0132477 A1* | 5/2013 | Bosworth ............. H04L 63/107 709/204 |
| 2013/0147837 A1 | 6/2013 | Stroila |
| 2013/0173467 A1 | 7/2013 | Nuzzi et al. |
| 2013/0203373 A1 | 8/2013 | Edge |
| 2013/0210518 A1 | 8/2013 | Barclay et al. |
| 2013/0217366 A1 | 8/2013 | Kolodziej |
| 2013/0254227 A1 | 9/2013 | Shim et al. |
| 2013/0304243 A1 | 11/2013 | Iseli |
| 2013/0325964 A1* | 12/2013 | Berberat ................ H04L 67/52 709/204 |
| 2014/0003739 A1 | 1/2014 | S V et al. |
| 2014/0013243 A1 | 1/2014 | Flynn, III et al. |
| 2014/0043355 A1 | 2/2014 | Kim et al. |
| 2014/0057648 A1 | 2/2014 | Lyman et al. |
| 2014/0066106 A1 | 3/2014 | Ngo et al. |
| 2014/0086562 A1 | 3/2014 | Lassman et al. |
| 2014/0089801 A1 | 3/2014 | Agrawal |
| 2014/0122502 A1 | 5/2014 | Kalmes et al. |
| 2014/0129981 A1 | 5/2014 | Soderberg |
| 2014/0153837 A1 | 6/2014 | Steiner |
| 2014/0153902 A1 | 6/2014 | Pearson et al. |
| 2014/0171036 A1 | 6/2014 | Simmons |
| 2014/0188815 A1 | 7/2014 | Mentz et al. |
| 2014/0280140 A1 | 9/2014 | Ling et al. |
| 2014/0281847 A1 | 9/2014 | Marra et al. |
| 2014/0289157 A1 | 9/2014 | Kenna, III et al. |
| 2014/0289597 A1 | 9/2014 | Kim |
| 2014/0289833 A1* | 9/2014 | Briceno ................ H04L 9/006 726/5 |
| 2014/0359656 A1 | 12/2014 | Banica et al. |
| 2015/0013016 A1 | 1/2015 | Kanter et al. |
| 2015/0042572 A1 | 2/2015 | Lombardi et al. |
| 2015/0058916 A1 | 2/2015 | Rostami-Hesarsorkh et al. |
| 2015/0058957 A1 | 2/2015 | Halliday et al. |
| 2015/0081630 A1 | 3/2015 | Linsalata et al. |
| 2015/0103097 A1 | 4/2015 | Li |
| 2015/0120293 A1 | 4/2015 | Wohlert et al. |
| 2015/0127643 A1 | 5/2015 | Cohen et al. |
| 2015/0134318 A1 | 5/2015 | Cuthbert et al. |
| 2015/0161178 A1 | 6/2015 | B Doiu |
| 2015/0161822 A1 | 6/2015 | Basu |
| 2015/0163629 A1 | 6/2015 | Cheung |
| 2015/0018599 A1 | 7/2015 | Thompson |
| 2015/0188869 A1 | 7/2015 | Gilad et al. |
| 2015/0220606 A1 | 8/2015 | Ito et al. |
| 2015/0024971 A1 | 9/2015 | Stefansson et al. |
| 2015/0334347 A1 | 11/2015 | Kang et al. |
| 2015/0341447 A1 | 11/2015 | Patil |
| 2015/0035619 A1 | 12/2015 | Rotem et al. |
| 2015/0370320 A1 | 12/2015 | Connor |
| 2015/0381688 A1 | 12/2015 | Jenkins et al. |
| 2016/0050704 A1 | 2/2016 | von Sneidern et al. |
| 2016/0119272 A1 | 4/2016 | Rubinstein et al. |
| 2016/0139748 A1 | 5/2016 | Iwaizumi et al. |
| 2016/0149843 A1 | 5/2016 | Spicer et al. |
| 2016/0219402 A1 | 7/2016 | Zlmerman et al. |
| 2016/0234023 A1 | 8/2016 | Mozer et al. |
| 2016/0239457 A1 | 8/2016 | Grass et al. |
| 2016/0345035 A1 | 11/2016 | Han et al. |
| 2017/0026786 A1 | 1/2017 | Barron et al. |
| 2017/0035191 A1 | 2/2017 | Hu |
| 2017/0123487 A1 | 5/2017 | Hazra et al. |
| 2017/0132647 A1 | 5/2017 | Bostick et al. |
| 2017/0277684 A1 | 9/2017 | Dharmarajan Mary |
| 2017/0277685 A1 | 9/2017 | Takumi |
| 2017/0329481 A1 | 11/2017 | Stoop et al. |
| 2017/0339521 A1 | 11/2017 | Colonna et al. |
| 2017/0359686 A1 | 12/2017 | Colonna et al. |
| 2018/0013975 A1 | 1/2018 | Tang |
| 2018/0131663 A1 | 5/2018 | Halliday et al. |
| 2018/0139241 A1 | 5/2018 | Jacobsen et al. |
| 2018/0158370 A1 | 6/2018 | Pryor |
| 2019/0097812 A1 | 3/2019 | Toth |
| 2020/0112531 A1 | 4/2020 | Tang |
| 2020/0204726 A1 | 6/2020 | Ebsen et al. |
| 2020/0213804 A1 | 7/2020 | Sehn et al. |
| 2020/0288270 A1 | 9/2020 | Allen et al. |
| 2020/0329336 A1 | 10/2020 | Sehn et al. |
| 2020/0411058 A1 | 12/2020 | Sehn |
| 2021/0006526 A1 | 1/2021 | Allen et al. |
| 2021/0006527 A1 | 1/2021 | Allen et al. |
| 2021/0006528 A1 | 1/2021 | Allen et al. |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0273903 A1 | 9/2021 | Allen et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0342473 A1 | 11/2021 | Murphy et al. |
| 2021/0382564 A1 | 12/2021 | Blachly et al. |
| 2021/0397000 A1 | 12/2021 | Rodriguez, II |
| 2022/0121332 A1 | 4/2022 | Allen et al. |
| 2022/0130425 A1 | 4/2022 | Sehn |
| 2022/0237691 A1 | 7/2022 | Allen et al. |
| 2022/0276817 A1 | 9/2022 | Sehn |

FOREIGN PATENT DOCUMENTS

| | | |
|---|---|---|
| CN | 102118419 A | 7/2011 |
| CN | 102572575 A | 7/2012 |
| CN | 102945276 A | 2/2013 |
| CN | 103020303 A | 4/2013 |
| CN | 103248761 A | 8/2013 |
| CN | 103297936 A | 9/2013 |
| CN | 103391368 A | 11/2013 |
| CN | 103699662 A | 4/2014 |
| CN | 105760466 A | 7/2016 |
| CN | 103049761 B | 8/2016 |
| CN | 110163663 A | 8/2019 |
| CN | 110249359 A | 9/2019 |
| CN | 110462616 A | 11/2019 |
| CN | 107637099 B | 10/2020 |
| CN | 112040410 | 12/2020 |
| EP | 323479461 | 5/2020 |
| EP | 3707693 A1 | 9/2020 |
| EP | 3272078 B1 | 1/2022 |
| JP | 2012104106 A | 5/2012 |
| KR | 20060043137 A | 5/2006 |
| KR | 20070121728 A | 12/2007 |
| KR | 20120125381 A | 11/2012 |
| KR | 102017508 B1 | 8/2019 |
| KR | 102021727 B1 | 9/2019 |
| KR | 102051788 B1 | 12/2019 |
| KR | 10205759261 | 12/2019 |
| KR | 10207744161 | 2/2020 |
| KR | 10209406561 | 3/2020 |
| KR | 10211144661 | 5/2020 |
| KR | 102163528 B1 | 9/2020 |
| KR | 102217723 B1 | 2/2021 |
| KR | 102371138 B1 | 3/2022 |
| WO | WO-2016123381 A1 | 8/2016 |

(56) References Cited

FOREIGN PATENT DOCUMENTS

WO  WO-2016168591 A1  10/2016
WO  WO-2019094618 A1  5/2019

OTHER PUBLICATIONS

"U.S. Appl. No. 15/224,377, Response filed Sep. 14, 2021 to Final Office Action dated Apr. 14, 2021", 13 pgs.
"U.S. Appl. No. 16/841,817, Corrected Notice of Allowability dated Sep. 16, 2021", 2 pgs.
"U.S. Appl. No. 16/911,854, Corrected Notice of Allowability dated Sep. 16, 2021", 2 pgs.
"U.S. Appl. No. 14/494,226, Corrected Notice of Allowability dated Sep. 28, 2021", 2 pgs.
"U.S. Appl. No. 16/529,461, Notice of Allowance dated Oct. 1, 2021", 8 pgs.
"U.S. Appl. No. 17/023,175, Notice of Allowance dated Oct. 5, 2021", 7 pgs.
"U.S. Appl. No. 16/911,854, Corrected Notice of Allowability dated Oct. 6, 2021", 2 pgs.
"U.S. Appl. No. 16/662,956, Response filed Oct. 5, 2021 to Non Final Office Action dated Jul. 21, 2021", 10 pgs.
"U.S. Appl. No. 15/224,377, Notice of Allowance dated Oct. 13, 2021", 14 pgs.
"U.S. Appl. No. 16/933,205, Response filed Oct. 18, 2021 to Non Final Office Action dated Apr. 16, 2021", 13 pgs.
"U.S. Appl. No. 16/933,366, Final Office Action dated Oct. 21, 2021", 18 pgs.
"U.S. Appl. No. 15/224,377, Corrected Notice of Allowability dated Oct. 26, 2021", 2 pgs.
"U.S. Appl. No. 16/662,956, Final Office Action dated Oct. 27, 2021", 15 pgs.
"U.S. Appl. No. 15/224,355, Notice of Allowance dated Nov. 3, 2021", 10 pgs.
"U.S. Appl. No. 15/224,365, Appeal Brief filed Nov. 10, 2021", 15 pgs.
"U.S. Appl. No. 15/224,355, Notice of Allowability dated Jul. 21, 2021", 13 pgs.
"U.S. Appl. No. 15/224,355, Corrected Notice of Allowability dated Nov. 18, 2021", 3 pgs.
"U.S. Appl. No. 16/933,205, Final Office Action dated Nov. 29, 2021", 21 pgs.
"U.S. Appl. No. 14/494,226, Corrected Notice of Allowability dated Dec. 6, 2021", 2 pgs.
"U.S. Appl. No. 15/947,350, Appeal Brief filed Dec. 8, 2021", 23 pgs.
"U.S. Appl. No. 15/224,365, Examiner's Answer to Appeal Brief dated Dec. 15, 2021", 2 pgs.
"U.S. Appl. No. 16/841,817, Notice of Allowance dated Dec. 16, 2021", 8 pgs.
"European Application Serial No. 21195813.7, Extended European Search Report dated Dec. 20, 2021", 8 pgs.
"U.S. Appl. No. 16/841,817, Corrected Notice of Allowability dated Dec. 30, 2021", 2 pgs.
"U.S. Appl. No. 16/529,461, Advisory Action dated Jan. 8, 2021", 4 pgs.
"U.S. Appl. No. 15/224,372, Notice of Allowance dated Jan. 12, 2021", 8 pgs.
"U.S. Appl. No. 16/000,657, Notice of Allowance dated Feb. 4, 2021", 8 pgs.
"Canadian Application Serial No. 3,027,981, Response filed Feb. 2, 2021 to Office Action dated Oct. 2, 2020", 15 pgs.
"U.S. Appl. No. 16/529,461, Non Final Office Action dated Feb. 22, 2021", 27 pgs.
"European Application Serial No. 15870874.3, Communication Pursuant to Article 94(3) EPC dated Feb. 22, 2021", 5 pgs.
"U.S. Appl. No. 14/494,226, Appeal Decision dated Feb. 26, 2021", 8 pgs.

"U.S. Appl. No. 16/667,814, Corrected Notice of Allowability dated Mar. 2, 2021", 2 pgs.
"U.S. Appl. No. 15/947,350, Response filed Mar. 1, 2021 to Non Final Office Action dated Sep. 28, 2020", 12 pgs.
"U.S. Appl. No. 16/911,854, Non Final Office Action dated Mar. 3, 2021", 12 pgs.
"U.S. Appl. No. 16/933,279, Non Final Office Action dated Mar. 25, 2021", 41 pgs.
"U.S. Appl. No. 16/662,956, Final Office Action dated Mar. 29, 2021", 17 pgs.
"U.S. Appl. No. 15/224,377, Response filed Mar. 30, 2021 to Non Final Office Action dated Oct. 30, 2020", 14 pgs.
"U.S. Appl. No. 15/947,350, Final Office Action dated Apr. 8, 2021", 13 pgs.
"U.S. Appl. No. 15/224,312, Response filed Apr. 9, 2021 to Non Final Office Action dated Nov. 9, 2020", 17 pgs.
"U.S. Appl. No. 15/224,377, Final Office Action dated Apr. 14, 2021", 14 pgs.
"U.S. Appl. No. 16/933,205, Non Final Office Action dated Apr. 16, 2021", 39 pgs.
"U.S. Appl. No. 16/933,366, Non Final Office Action dated Apr. 27, 2021", 39 pgs.
"U.S. Appl. No. 16/529,461, Response filed Apr. 29, 2021 to Non Final Office Action dated Feb. 22, 2021", 12 pgs.
"U.S. Appl. No. 16/000,657, 312 Amendment filed Apr. 30, 2021", 8 pgs.
"U.S. Appl. No. 16/000,657, PTO Response to Rule 312 Communication dated May 11, 2021", 3 pgs.
"U.S. Appl. No. 15/224,312, Final Office Action dated May 12, 2021", 21 pgs.
"U.S. Appl. No. 16/841,817, Non Final Office Action dated May 26, 2021", 7 pgs.
"U.S. Appl. No. 16/911,854, Response filed May 28, 2021 to Non Final Office Action dated Mar. 3, 2021", 8 pgs.
"Korean Application Serial No. 10-2021-7004376, Notice of Preliminary Rejection dated May 31, 2021", w/ English Translation, 9 pgs.
"U.S. Appl. No. 17/023,175, Non Final Office Action dated Jun. 8, 2021", 8 pgs.
"U.S. Appl. No. 14/494,226, Notice of Allowance dated Jun. 9, 2021", 7 pgs.
"U.S. Appl. No. 16/911,854, Notice of Allowance dated Jun. 17, 2021", 8 pgs.
"U.S. Appl. No. 16/529,461, Notice of Allowance dated Jun. 23, 2021", 9 pgs.
"U.S. Appl. No. 16/662,956, Response filed Jun. 24, 2021 to Final Office Action dated Mar. 29, 2021", 10 pgs.
"U.S. Appl. No. 15/224,355, Notice of Allowance dated Jul. 13, 2021", 16 pgs.
"U.S. Appl. No. 16/662,956, Non Final Office Action dated Jul. 21, 2021", 12 pgs.
"U.S. Appl. No. 14/494,226, Notice of Allowance dated Aug. 25, 2021", 5 pgs.
"U.S. Appl. No. 16/933,279, Response filed Aug. 25, 2021 to Non Final Office Action dated Mar. 25, 2021", 14 pgs.
"U.S. Appl. No. 16/841,817, Response filed Aug. 26, 2021 to Non Final Office Action dated May 26, 2021", 6 pgs.
"U.S. Appl. No. 16/933,366, Response filed Aug. 27, 2021 to Non Final Office Action daterd Apr. 27, 2021", 16 pgs.
"U.S. Appl. No. 16/841,817, Notice of Allowance dated Sep. 3, 2021", 7 pgs.
"Korean Application Serial No. 10-2021-7004376, Response filed Aug. 12, 2021 to Notice of Preliminary Rejection dated May 31, 2021", w/ English Translation, 47 pgs.
"U.S. Appl. No. 17/023,175, Response filed Sep. 8, 2021 to Non Final Office Action dated Jun. 8, 2021", 6 pgs.
U.S. Appl. No. 17/323,702, filed May 18, 2021, Ephemeral Gallery of Ephemeral Messages With Opt-In Permanence.
U.S. Appl. No. 17/234,012, filed Apr. 19, 2021, Apparatus and Method for Automated Privacy Protection in Distribusted Images.
U.S. Appl. No. 14/492,226, filed Sep. 23, 2014, User Interface to Augment an Image (as amended).

(56) References Cited

OTHER PUBLICATIONS

U.S. Appl. No. 14/612,692 U.S. Pat. No. 10,133,705, filed Feb. 3, 2015, Multichannel System.
U.S. Appl. No. 15/152,975 U.S. Pat. No. 10,416,845, filed May 12, 2016, Multichannel System.
U.S. Appl. No. 16/529,461, filed Aug. 1, 2019, Multichannel System.
U.S. Appl. No. 15/074,029 U.S. Pat. No. 10,616,239, filed Mar. 18, 2016, Geo-Fence Authorization Provisioning.
U.S. Appl. No. 16/541,919, filed Aug. 15, 2019, Geo-Fence Authorization Provisioning.
U.S. Appl. No. 15/702,511 U.S. Pat. No. 10,476,830, filed Sep. 12, 2017, Ephemeral Gallery of Ephemeral Messages.
U.S. Appl. No. 15/947,350, filed Apr. 6, 2018, Automated Chronological Display of Ephemeral Message Gallery.
U.S. Appl. No. 16/933,205, filed Jul. 20, 2020, Ephemeral Message Collection UI Indicia.
U.S. Appl. No. 16/933,279, filed Jul. 20, 2020, Display Duration Assignment for Ephemeral Messages.
U.S. Appl. No. 16/933,366, filed Jul. 20, 2020, Automated Management of Ephemeral Message Collections.
U.S. Appl. No. 14/505,478 U.S. Pat. No. 9,537,811, filed Oct. 2, 2014, Ephemeral Gallery of Ephemeral Messages.
U.S. Appl. No. 15/224,312, filed Jul. 29, 2016, Gallery of Ephemeral Messages.
U.S. Appl. No. 15/224,343, filed Jul. 29, 2016, Ephemeral Gallery of Visual Media Messages.
U.S. Appl. No. 15/224,355, filed Jul. 29, 2016, Ephemeral Gallery Elimination Based on Gallery and Message Timers (as amended).
U.S. Appl. No. 15/224,359, filed Jul. 29, 2016, Ephemeral Gallery User Interface With Remaining Gallery Time Indication.
U.S. Appl. No. 15/224,365, filed Jul. 29, 2019, Gallery User Interface With Last Posted Message Indication (as amended).
U.S. Appl. No. 15/224,372, filed Jul. 29, 2016, Ephemeral Message Gallery User Interface With Screenshot Messages.
U.S. Appl. No. 15/224,377, filed Jul. 29, 2016, Ephemeral Message Gallery User Interface With Online Viewing History Indicia.
U.S. Appl. No. 15/224,383 U.S. Pat. No. 10,708,210, filed Jul. 29, 2016, Multi-User Ephermeral Message Gallery.
U.S. Appl. No. 14/578,271 U.S. Pat. No. 9,854,219, filed Dec. 19, 2014, Gallery of Videos Set to an Audio Time Line.
U.S. Appl. No. 14/967,472 U.S. Pat. No. 10,311,916, filed Dec. 14, 2015, Gallery of Videos Set to an Audio Time Line.
U.S. Appl. No. 16/376,598 U.S. Pat. No. 10,580,458, filed Apr. 5, 2019, Gallery of Videos Set to an Audio Time Line.
U.S. Appl. No. 16/703,526, filed Dec. 4, 2019, Routing Messages by Message Parameter.
U.S. Appl. No. 17/023,175, filed Sep. 16, 2020, Routing Messages by Message Parameter.
U.S. Appl. No. 14/634,417 U.S. Pat. No. 10,284,508, filed Feb. 27, 2015, Ephemeral Gallery of Ephemeral Messages With Opt-In Permanence.
U.S. Appl. No. 16/000,657, filed Jun. 5, 2018, Ephemeral Gallery of Ephemeral Messages With Opt-In Permanence.
U.S. Appl. No. 14/304,855 U.S. Pat. No. 9,113,301, filed Jun. 13, 2014, Geo-Location Based Event Gallery.
U.S. Appl. No. 14/738,069 U.S. Pat. No. 9,532,171, filed Jun. 12, 2015, Geo-Location Based Event Gallery.
U.S. Appl. No. 15/298,806 U.S. Pat. No. 10,200,813, filed Oct. 20, 2016, Geo-Location Based Event Gallery.
U.S. Appl. No. 15/946,990 U.S. Pat. No. 10,524,087, filed Apr. 6, 2018, Message Destination List Mechanism (as amended).
U.S. Appl. No. 16/219,577 U.S. Pat. No. 10,659,914, filed Dec. 13, 2018, Geo-Location Based Event Gallery.
U.S. Appl. No. 16/841,817, filed Apr. 7, 2020, Geo-Location Based Event Gallery.
U.S. Appl. No. 14/529,064, filed Oct. 30, 2014, Priority Based Placement of Messages in Geo-Location Based Event Gallery.
U.S. Appl. No. 14/578,258 U.S. Pat. No. 9,385,983, filed Dec. 19, 2014, Gallery of Messages From Individuals With a Shared Interest.
U.S. Appl. No. 15/137,608 U.S. Pat. No. 10,514,876, filed Apr. 25, 2016, Gallery of Messages From Individuals With a Shared Interest.
U.S. Appl. No. 16/662,956, filed Oct. 24, 2019, Gallery of Messages From Individuals With a Shared Interest.
U.S. Appl. No. 14/523,728 U.S. Pat. No. 9,094,137, filed Oct. 24, 2014, Priority Based Placement of Messages in a Geo-Location Based Event Gallery.
U.S. Appl. No. 14/808,283 U.S. Pat. No. 9,430,783, filed Jul. 24, 2015, Prioritization of Messages Within Gallery.
U.S. Appl. No. 15/208,460 U.S. Pat. No. 9,693,191, filed Jul. 12, 2016, Prioritization of Messages Within Gallery.
U.S. Appl. No. 15/416,846 U.S. Pat. No. 9,825,898, filed Jan. 26, 2017, Prioritization of Messages Within a Message Collection.
U.S. Appl. No. 15/787,467 U.S. Pat. No. 10,182,311, filed Oct. 18, 2017, Prioritization of Messages Within a Message Collection.
U.S. Appl. No. 16/204,886 U.S. Pat. No. 10,448,201, filed Nov. 29, 2018, Prioritization of Messages Within a Message Collection.
U.S. Appl. No. 16/511,834 U.S. Pat. No. 10,623,891, filed Jul. 15, 2019, Priorotization of Messages Within a Message Collection.
U.S. Appl. No. 16/709,092 U.S. Pat. No. 10,779,113, filed Dec. 10, 2019, Prioritization of Messages Within a Message Collection.
U.S. Appl. No. 16/911,854, filed Jun. 25, 2020, Prioritization of Messages Within a Message Collection.
U.S. Appl. No. 14/723,400 U.S. Pat. No. 9,396,354, filed May 27, 2015, Apparatus and Method for Automated Privacy Protection in Distributed Images.
U.S. Appl. No. 15/212,095 U.S. Pat. No. 9,785,796, filed Jul. 15, 2016, Apparatus and Method for Automated Privacy Protection in Distributed Images.
U.S. Appl. No. 15/729,582 U.S. Pat. No. 10,572,681, filed Oct. 10, 2017, Apparatus and Method for Automated Privacy Protection in Distributed Images.
U.S. Appl. No. 16/667,814, filed Oct. 29, 2019, Apparatus and Method for Automated Privacy Protection in Distributed Images.
"U.S. Appl. No. 14/548,590, Appeal Decision mailed Mar. 26, 2020", 13 pgs.
"U.S. Appl. No. 14/548,590, Notice of Allowance dated Jun. 17, 2020", 9 pgs.
"U.S. Appl. No. 15/224,312, Non Final Office Action dated Nov. 9, 2020", 18 pgs.
"U.S. Appl. No. 15/224,312, Response filed Oct. 1, 2020 to Final Office Action dated May 1, 2020", 18 pgs.
"U.S. Appl. No. 15/224,343, Notice of Allowance dated Jul. 29, 2020", 7 pgs.
"U.S. Appl. No. 15/224,343, Notice of Allowance dated Nov. 16, 2020", 7 pgs.
"U.S. Appl. No. 15/224,355, Response filed Sep. 1, 2020 to Final Office Action dated May 1, 2020", 16 pgs.
"U.S. Appl. No. 15/224,359, Notice of Allowance dated Nov. 3, 2020", 15 pgs.
"U.S. Appl. No. 15/224,359, Response filed Sep. 1, 2020 to Final Office Action dated May 1, 2020", 13 pgs.
"U.S. Appl. No. 15/224,365, Final Office Action dated Jul. 2, 2020", 11 pgs.
"U.S. Appl. No. 15/224,365, Non Final Office Action dated Dec. 10, 2020", 16 pgs.
"U.S. Appl. No. 15/224,365, Response filed Oct. 2, 2020 to Final Office Action dated Jul. 2, 2020", 13 pgs.
"U.S. Appl. No. 15/224,372, Response filed Oct. 5, 2020 to Final Office Action dated May 4, 2020", 17 pgs.
"U.S. Appl. No. 15/224,377, Non Final Office Action dated Oct. 30, 2020", 15 pgs.
"U.S. Appl. No. 15/224,377, Response filed Sep. 8, 2020 to Final Office Action dated May 5, 2020", 15 pgs.
"U.S. Appl. No. 15/424,184, Advisory Action dated May 26, 2020", 6 pgs.
"U.S. Appl. No. 15/424,184, Advisory Action dated Aug. 25, 2020", 5 pgs.
"U.S. Appl. No. 15/424,184, Final Office Action dated Mar. 9, 2020", 19 pgs.
"U.S. Appl. No. 15/424,184, Final Office Action dated Jul. 27, 2020", 18 pgs.

(56) References Cited

OTHER PUBLICATIONS

"U.S. Appl. No. 15/424,184, Final Office Action dated Sep. 9, 2019", 13 pgs.
"U.S. Appl. No. 15/424,184, Non Final Office Action dated Jun. 29, 2020", 19 pgs.
"U.S. Appl. No. 15/424,184, Non Final Office Action dated Dec. 2, 2019", 16 pgs.
"U.S. Appl. No. 15/424,184, Notice of Allowance dated Sep. 25, 2020", 10 pgs.
"U.S. Appl. No. 15/424,184, Response filed Mar. 2, 2020 to Non Final Office Action dated Dec. 2, 2019", 11 pgs.
"U.S. Appl. No. 15/424,184, Response filed May 11, 2020 to Final Office Action dated Mar. 9, 2020", 14 pgs.
"U.S. Appl. No. 15/424,184, Response filed Jul. 13, 2020 to Non Final Office Action dated May 5, 2020", 11 pgs.
"U.S. Appl. No. 15/424,184, Response filed Aug. 5, 2020 to Final Office Action dated Jul. 27, 2020", 12 pgs.
"U.S. Appl. No. 15/424,184, Response filed Aug. 21, 2019 to Non Final Office Action dated May 21, 2019", 12 pgs.
"U.S. Appl. No. 15/424,184, Response filed Sep. 1, 2020 to Advisory Action dated Aug. 25, 2020", 9 pgs.
"U.S. Appl. No. 15/424,184, Response filed Nov. 11, 2019 to Final Office Action dated Sep. 9, 2019", 12 pgs.
"U.S. Appl. No. 15/470,004, Examiner Interview Summary dated Sep. 12, 2019", 3 pgs.
"U.S. Appl. No. 15/470,004, Notice of Allowance dated Oct. 22, 2019", 10 pgs.
"U.S. Appl. No. 15/470,004, Response filed Sep. 9, 2019 to Final Office Action dated May 20, 2019", 13pqs.
"U.S. Appl. No. 15/470,025, Notice of Allowance dated Oct. 22, 2019", 10 pgs.
"U.S. Appl. No. 15/470,025, Response filed Sep. 12, 2019 to Final Office Action dated May 20, 2019", 14 pgs.
"U.S. Appl. No. 15/474,821, Advisory Action dated Dec. 19, 2019", 3 pgs.
"U.S. Appl. No. 15/474,821, Final Office Action dated Sep. 3, 2019", 19 pgs.
"U.S. Appl. No. 15/474,821, Notice of Non-Compliant Amendment dated Sep. 8, 2020", 6 pgs.
"U.S. Appl. No. 15/474,821, Response filed on Dec. 2, 2019 to Final Office Action dated Sep. 3, 2019", 10 pgs.
"U.S. Appl. No. 15/673,137, Final Office Action dated Jan. 27, 2020", 11 pgs.
"U.S. Appl. No. 15/673,137, Non Final Office Action dated May 12, 2020", 14 pgs.
"U.S. Appl. No. 15/673,137, Non Final Office Action dated Aug. 30, 2019", 10 pgs.
"U.S. Appl. No. 15/673,137, Response filed Apr. 6, 2020 to Final Office Action dated Jan. 27, 2020", 14 pgs.
"U.S. Appl. No. 15/673,137, Response filed Jul. 8, 2020 to Non Final Office Action dated May 12, 2020", 15 pgs.
"U.S. Appl. No. 15/673,137, Response filed Oct. 18, 2019 to Non-Final Office Action dated Aug. 30, 2019", 12 pgs.
"U.S. Appl. No. 15/729,582, Corrected Notice of Allowability dated Dec. 18, 2019", 3 pgs.
"U.S. Appl. No. 15/837,935, Notice of Allowance dated Nov. 25, 2019", 18 pgs.
"U.S. Appl. No. 15/947,350, Examiner Interview Summary dated Jul. 20, 2020", 4 pgs.
"U.S. Appl. No. 15/947,350, Non Final Office Action dated Sep. 28, 2020", 13 pgs.
"U.S. Appl. No. 15/947,350, Response filed Sep. 4, 2020 to Final Office Action dated May 4, 2020", 12 pgs.
"U.S. Appl. No. 16/000,657, Advisory Action dated Oct. 19, 2020", 3 pgs.
"U.S. Appl. No. 16/000,657, Examiner Interview Summary dated Sep. 25, 2020", 3 pgs.
"U.S. Appl. No. 16/000,657, Final Office Action dated Jul. 27, 2020", 17 pgs.
"U.S. Appl. No. 16/000,657, Response filed Jul. 6, 2020 to Non Final Office Action dated Mar. 6, 2020", 13 pgs.
"U.S. Appl. No. 16/000,657, Response filed Sep. 28, 2020 to Final Office Action dated Jul. 27, 2020", 12 pgs.
"U.S. Appl. No. 16/155,782, Final Office Action dated Jan. 3, 2020", 14 pgs.
"U.S. Appl. No. 16/155,782, Non Final Office Action dated May 14, 2020", 14 pgs.
"U.S. Appl. No. 16/155,782, Notice of Allowance dated Sep. 21, 2020", 5 pgs.
"U.S. Appl. No. 16/155,782, Response filed Apr. 3, 2020 to Final Office Action dated Jan. 3, 2020", 10 pgs.
"U.S. Appl. No. 16/155,782, Response filed Aug. 14, 2020 to Non Final Office Action dated May 14, 2020", 9 pgs.
"U.S. Appl. No. 16/155,782, Response filed Oct. 8, 2019 to Non-Final Office Action dated Jul. 10, 2019", 10 pgs.
"U.S. Appl. No. 16/212,313, Final Office Action dated Jun. 22, 2020", 20 pgs.
"U.S. Appl. No. 16/212,313, Non Final Office Action dated Feb. 4, 2020", 20 pgs.
"U.S. Appl. No. 16/212,313, Non Final Office Action dated Aug. 30, 2019", 18 pgs.
"U.S. Appl. No. 16/212,313, Response filed May 4, 2020 to Non Final Office Action dated Feb. 4, 2020", 12 pgs.
"U.S. Appl. No. 16/212,313, Response filed Dec. 2, 2019 to Non Final Office Action dated Aug. 30, 2019", 11 pgs.
"U.S. Appl. No. 16/219,577, Notice of Allowance dated Jan. 15, 2020", 7 pgs.
"U.S. Appl. No. 16/428,210, Advisory Action dated Sep. 9, 2020", 3 pgs.
"U.S. Appl. No. 16/428,210, Examiner Interview Summary dated Aug. 28, 2020", 3 pgs.
"U.S. Appl. No. 16/428,210, Final Office Action dated Jun. 29, 2020", 16 pgs.
"U.S. Appl. No. 16/428,210, Non Final Office Action dated Apr. 6, 2020", 16 pgs.
"U.S. Appl. No. 16/428,210, Response filed Jun. 3, 2020 to Non Final Office Action dated Apr. 6, 2020", 10 pgs.
"U.S. Appl. No. 16/428,210, Response filed Aug. 27, 2020 to Final Office Action dated Jun. 29, 2020", 12 pgs.
"U.S. Appl. No. 16/529,461, Examiner Interview Summary dated Jul. 31, 2020", 3 pgs.
"U.S. Appl. No. 16/529,461, Final Office Action dated Oct. 20, 2020", 24 pgs.
"U.S. Appl. No. 16/529,461, Response filed Jul. 29, 2020 to Non Final Office Action dated May 21, 2020", 11 pgs.
"U.S. Appl. No. 16/529,461, Response filed Dec. 18, 2020 to Final Office Action dated Oct. 20, 2020", 10 pgs.
"U.S. Appl. No. 16/541,919, Notice of Allowance dated Oct. 15, 2020", 8 pgs.
"U.S. Appl. No. 16/662,956, Non Final Office Action dated Oct. 6, 2020", 13 pgs.
"U.S. Appl. No. 16/662,956, Response filed Dec. 2, 2020 to Non Final Office Action dated Oct. 6, 2020", 11 pgs.
"U.S. Appl. No. 16/667,814, Corrected Notice of Allowability dated Dec. 23, 2020", 2 pgs.
"U.S. Appl. No. 16/667,814, Non Final Office Action dated Aug. 17, 2020", 6 pgs.
"U.S. Appl. No. 16/667,814, Notice of Allowance dated Nov. 23, 2020", 8 pgs.
"U.S. Appl. No. 16/667,814, Response filed Oct. 29, 2020 to Non Final Office Action dated Aug. 17, 2020", 7 pgs.
"U.S. Appl. No. 16/703,526, Corrected Notice of Allowability dated Sep. 2, 2020", 2 pgs.
"U.S. Appl. No. 16/703,526, Supplemental Notice of Allowability dated Aug. 10, 2020", 2 pgs.
"U.S. Appl. No. 16/709,092, Corrected Notice of Allowability dated Jul. 22, 2020", 2 pgs.
"U.S. Appl. No. 16/808,101, Preliminary Amendment filed Mar. 10, 2020", 8 pgs.
"U.S. Appl. No. 16/943,706, Non Final Office Action dated Sep. 8, 2020", 16 pgs.

(56) References Cited

OTHER PUBLICATIONS

"U.S. Appl. No. 16/943,804, Non Final Office Action dated Sep. 8, 2020", 14 pgs.
"Canadian Application Serial No. 2,962,822, Office Action dated Jul. 20, 2020", 5 pgs.
"Canadian Application Serial No. 3,027,981, Office Action dated Oct. 2, 2020", 5 pgs.
"Chinese Application Serial No. 201580065266.7, Office Action dated Mar. 19, 2020", w/English translation, 15 pgs.
"Chinese Application Serial No. 201580065266.7, Response filed Jul. 17, 2020 Office Action dated Mar. 19, 2020", w/ English Claims, 11 pgs.
"Chinese Application Serial No. 201580070593.1, Office Action dated Apr. 8, 2020", w/English Translation, 11 pgs.
"Chinese Application Serial No. 201580070593.1, Response filed Aug. 13, 2020 to Office Action dated Apr. 8, 2020", w/ English Claims.
"Chinese Application Serial No. 201580076228.1, Decision of Rejection dated Jul. 9, 2019", w/ English Translation, 19 pgs.
"Chinese Application Serial No. 201580076228.1, Response filed Oct. 11, 2019 to Decision of Rejection dated Jul. 9, 2019", w/ English Claims, 13 pgs.
"Chinese Application Serial No. 201680035076.5, Office Action dated May 27, 2020", w/English Translation, 28 pgs.
"Chinese Application Serial No. 201680035076.5, Office Action dated Sep. 4, 2019", w/English Translation, 16 pgs.
"Chinese Application Serial No. 201680035076.5, Response filed Jul. 9, 2020 to Office Action dated May 27, 2020", w/ English Claims, 18 pgs.
"Chinese Application Serial No. 201680035076.5, Response filed Dec. 26, 2019 to Office Action dated Sep. 4, 2019", w/ English Claims, 15 pgs.
"European Application Serial No. 15733026.7, Decision to Refuse a European Patent Application dated Nov. 18, 2019", 20 pgs.
"European Application Serial No. 15782165.3, Decision to Refuse a European Patent Application dated Mar. 19, 2020", 23 pgs.
"European Application Serial No. 15782165.3, Response filed Jan. 10, 2020 to Summons to Attend Oral Proceedings mailed Sep. 18, 2019", 18 pgs.
"European Application Serial No. 15782165.3, Summons to Attend Oral Proceedings mailed Sep. 18, 2019", 6 pgs.
"European Application Serial No. 15787854.7, Communication Pursuant to Article 94(3) EPC dated Feb. 12, 2020", 7 pgs.
"European Application Serial No. 16829020.3, Communication Pursuant to Article 94(3) EPC dated Sep. 9, 2020", 3 pgs.
"European Application Serial No. 18747246.9, Communication Pursuant to Article 94(3) EPC dated Jun. 25, 20", 10 pgs.
"European Application Serial No. 18747246.9, Extended European Search Report dated Nov. 7, 2019", 7 pgs.
"European Application Serial No. 18747246.9, Response Filed Jun. 3, 2020 to Extended European Search Report dated Nov. 7, 2019", 15 pgs.
"European Application Serial No. 20173925.7, Extended European Search Report dated Aug. 20, 2020", 8 pgs.
"International Application Serial No. PCT/US2018/01 6723, International Preliminary Report on Patentability dated Aug. 15, 2019", 19 pgs.
"International Application Serial No. PCT/US2018/024093, International Preliminary Report on Patentability dated Oct. 10, 2019", 7 pgs.
"Korean Application Serial No. 10-2017-7012120, Notice of Preliminary Rejection dated Jun. 17, 2020", w/ English Translation, 8 pgs.
"Korean Application Serial No. 10-2017-7012120, Response filed Sep. 3, 2020 to Notice of Preliminary Rejection dated Jun. 17, 2020", wi English Claims, 22 pgs.
"Korean Application Serial No. 10-2018-7037070, Notice of Final Rejection dated Sep. 30, 2019", wi English Translation, 5 pgs.
"Korean Application Serial No. 10-2018-7037070, Notice of Final Rejection dated Nov. 25, 2019", w/ English Translation, 5 pgs.
"Korean Application Serial No. 10-2018-7037070, Response filed Oct. 23, 2019 to Notice of Final Rejection dated Sep. 30, 2019", w/ English Claims, 16 pgs.
"Korean Application Serial No. 10-2019-7030235, Response filed Jun. 22, 2020 to Final Office Action dated May 20, 2020", w/ English Claims, 16 pgs.
"Korean Application Serial No. 10-2019-7031595, Notice of Preliminary Rejection dated Sep. 1, 2020", w/ English Translation, 11 pgs.
"Korean Application Serial No. 10-2019-7036962, Notice of Preliminary Rejection dated Jan. 3, 2020", w/ English Translation, 11 pgs.
"Korean Application Serial No. 10-2019-7036962, Response filed Feb. 17, 2020 to Notice of Preliminary Rejection dated Jan. 3, 2020", w/ English Claims, 25 pgs.
"Korean Application Serial No. 10-2019-7038483, Notice of Preliminary Rejection dated Jan. 31, 2020", w/ English Translation, 4 pgs.
"Korean Application Serial No. 10-2019-7038483, Response filed Mar. 10, 2020 to Notice of Preliminary Rejection dated Jan. 31, 2020", w/ English Claims, 19 pgs.
"Korean Application Serial No. 10-2020-7008140, Notice of Preliminary Rejection dated Jun. 16, 2020", w/ English Translation, 7 pgs.
"Korean Application Serial No. 10-2020-7008140, Response filed Aug. 14, 2020 to Notice of Preliminary Rejection dated Jun. 16, 2020", w/ English Claims, 21 pgs.
"Korean Application Serial No. 10-2020-7024025, Notice of Preliminary Rejection dated Sep. 1, 2020", w/ English Translation, 4 pgs.
"Surprise!", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear> (Oct. 3, 2013), 5 pgs.
Isaac, Mike, "New Mobile App Vyclone Aims to Remix Social Video From Every Angle", All Things D, The Wallstreet Journal, [Online] Retrieved from the Internet: <URL: http://allthingsd.com/20120718/new-mobile-app-vyclone-aims-to-remix-social-video-from-every-angle/>, (Jul. 18, 2012), 4 pgs.
Rossignol, Joe, "How to screenshot Snapchat without sending notification", [Online] Retrieved from the Internet: <URL: https://www.idownloadblog.com/author/joerossignol/>, (May 3, 2014), 18 pgs.
Wagner, Kurt, "Snapchat Rolls Out Group-Sharing Feature for Concerts, Live Events", Mashable, [Online] Retrieved from the Internet on Sep. 12, 2019: <URL: https://mashable.com/2014/06/17/snapchat-our-story/?>, (Jun. 17, 2014), 16 pgs.
"U.S. Appl. No. 15/224,312, Appeal Brief filed Feb. 14, 2022", 23 pgs.
"U.S. Appl. No. 15/224,312, Examiner's Answer to Appeal Brief dated May 27, 2022", 12 pgs.
"U.S. Appl. No. 15/224,355, Corrected Notice of Allowability dated Feb. 9, 2022", 3 pgs.
"U.S. Appl. No. 15/224,355, Corrected Notice of Allowance dated Jun. 27, 2022", 3 pgs.
"U.S. Appl. No. 15/224,355, Notice of Allowance dated Jun. 15, 2022", 9 pgs.
"U.S. Appl. No. 15/224,377, 312 Amendment filed Jan. 7, 2022", 8 pgs.
"U.S. Appl. No. 15/224,377, Corrected Notice of Allowability dated Jan. 18, 2022", 2 pgs.

(56) References Cited

OTHER PUBLICATIONS

"U.S. Appl. No. 15/224,377, Corrected Notice of Allowability dated Apr. 14, 2022", 2 pgs.
"U.S. Appl. No. 15/224,377, Corrected Notice of Allowability dated May 17, 2022", 2 pgs.
"U.S. Appl. No. 15/224,377, Notice of Allowance dated Mar. 30, 2022", 8 pgs.
"U.S. Appl. No. 15/224,377, PTO Response to Rule 312 Communication dated Jan. 18, 2022", 1 pg.
"U.S. Appl. No. 15/947,350, Examiner's Answer dated Feb. 4, 2022", 8 pgs.
"U.S. Appl. No. 15/947,350, Examiner's Answer dated Feb. 8, 2022", 8 pgs.
"U.S. Appl. No. 16/662,956, Notice of Allowance dated Feb. 25, 2022", 12 pgs.
"U.S. Appl. No. 16/662,956, Response filed Jan. 25, 2022 to Final Office Action dated Oct. 27, 2021", 12 pgs.
"U.S. Appl. No. 16/662,956, Supplemental Notice of Allowability dated May 31, 2022", 5 pgs.
"U.S. Appl. No. 16/841,817, Corrected Notice of Allowability dated Mar. 23, 2022", 2 pgs.
"U.S. Appl. No. 16/933,205, Response filed Apr. 5, 2022 to Final Office Action dated Nov. 29, 2021", 13 pgs.
"U.S. Appl. No. 16/933,366, Non Final Office Action dated Jul. 25, 2022", 19 pgs.
"U.S. Appl. No. 16/933,366, Response filed Mar. 18, 2022 to Final Office Action dated Oct. 21, 2021", 12 pgs.
"U.S. Appl. No. 17/023,175, Supplemental Notice of Allowability dated Jan. 20, 2022", 2 pgs.
"U.S. Appl. No. 17/567,397, Non Final Office Action dated Aug. 22, 2022", 32 pgs.
"U.S. Appl. No. 17/683,725, Non Final Office Action dated Aug. 26, 2022", 19 pgs.
"Canadian Application Serial No. 3,027,981, Non-Final Office Action dated Jan. 28, 2022", 3 pgs.
"Canadian Application Serial No. 3,027,981, Response filed May 16, 2022 to Office Action dated Jan. 28, 2022", 18 pgs.
"Chinese Application Serial No. 202010978249.5, Office Action dated Mar. 11, 2022", w/English translation, 8 pgs.
"Chinese Application Serial No. 202010978249.5, Response filed Jul. 7, 2022 to Office Action dated Mar. 11, 2022", w/ English claims, 8 pgs.
"Korean Application Serial No. 10-2022-7007037, Notice of Preliminary Rejection dated Jul. 5, 2022", W/English Translation, 7 pgs.
U.S. Appl. 17/647,511, filed Jan. 10, 2022, Routing Messages By Message Parameter.
U.S. Appl. No. 17/663,739, filed May 17, 2022, Gallery of Messages From Individuals With a Shared Interest.
"U.S. Appl. No. 15/224,355, 312 Amendment filed Sep. 15, 22", 8 pgs.
"U.S. Appl. No. 17/567,624, Preliminary Amendment filed Sep. 20, 22", 7 pgs.
"U.S. Appl. No. 17/323,702, Non Final Office Action dated Sep. 21, 22", 36 pgs.
"U.S. Appl. No. 17/647,511, Non Final Office Action dated Sep. 22, 22", 12 pgs.
"U.S. Appl. No. 17/234,012, Preliminary Amendment filed Sep. 28, 22", 6 pgs.

\* cited by examiner

GEO-FENCE AUTHORIZATION PROVISIONING

CLAIM OF PRIORITY

This application is a continuation of and claims the benefit of priority of U.S. patent application Ser. No. 16/541,919, filed Aug. 15, 2019, which is a continuation of and claims the benefit of priority of U.S. patent application Ser. No. 15/074,029, filed Mar. 18, 2016, which claims the benefit of U.S. Provisional Application Ser. No. 62/134,689, filed Mar. 18, 2015, all of which are hereby incorporated by reference in their entireties.

TECHNICAL FIELD

The subject matter disclosed herein relates generally to exchanging electronic content in a computer network. More particularly, certain examples relate to authorization processes for access to a geo-location restricted collection of content associated with an event or entity.

BACKGROUND

Mobile devices, such as smartphones, are used to generate content. The content may be text messages, photographs (with or without augmenting text) and videos. Users can share such content with individuals in their social network. However, there is no mechanism for sharing content with strangers that are participating in a common event or entity.

BRIEF DESCRIPTION OF THE FIGURES

Example embodiments will be more fully appreciated in connection with the following detailed description taken in conjunction with the accompanying drawings, in which.

Like reference numerals refer to corresponding parts throughout the several views of the drawings.

DETAILED DESCRIPTION

The provisioning of authorization to access content (e.g., a collection of content posted by users, such as a Snapchat Story) based on geolocation is a delicate matter. On the one hand, access should not be too restrictive, particularly with respect to potential contributors and posters who are located within a geo-fence associated with an event or location (e.g., on a university campus). On the other hand, privacy rights and other concerns may make it undesirable to simply provision content access to any user who is located within a geo-fence. Looking specifically at the example of a university campus, it may be undesirable (or even dangerous) to allow anyone simply located on the campus to access and view photographs and other content posted by students. Numerous technical challenges exist in the provisioning of such content access.

Various example methods are described for provisioning access to content based, not only on geolocation within a geo-fence, but also based on various secondary data and criteria. Such data includes, for example, communication identifiers (e.g., an email address) associated with an authorized entity or institution (e.g., indicating a domain of a particular university or company), as well as activity data regarding a user stored in a user profile that serves as the basis for supplemental authorization decisioning. Such activity data may include communications metadata (e.g., historical data regarding other content collections to which a particular user has had access) and device activity data (e.g., screenshot activity or image manipulation using geo-filters). Other secondary data that may be used includes device signature or setting information (e.g., a language setting) or a real-time image processing (e.g. using facial recognition).

This secondary data may be processed to determine whether a particular user has had sufficient and meaningful contacts with an entity or event, or with previous content collections associated with an event or entity (e.g., a previous Snapchat Story for a particular university campus). An example system for addressing of the technical challenges associated with the provisioning of content access within a geo-fence is described below.

Figure 1:
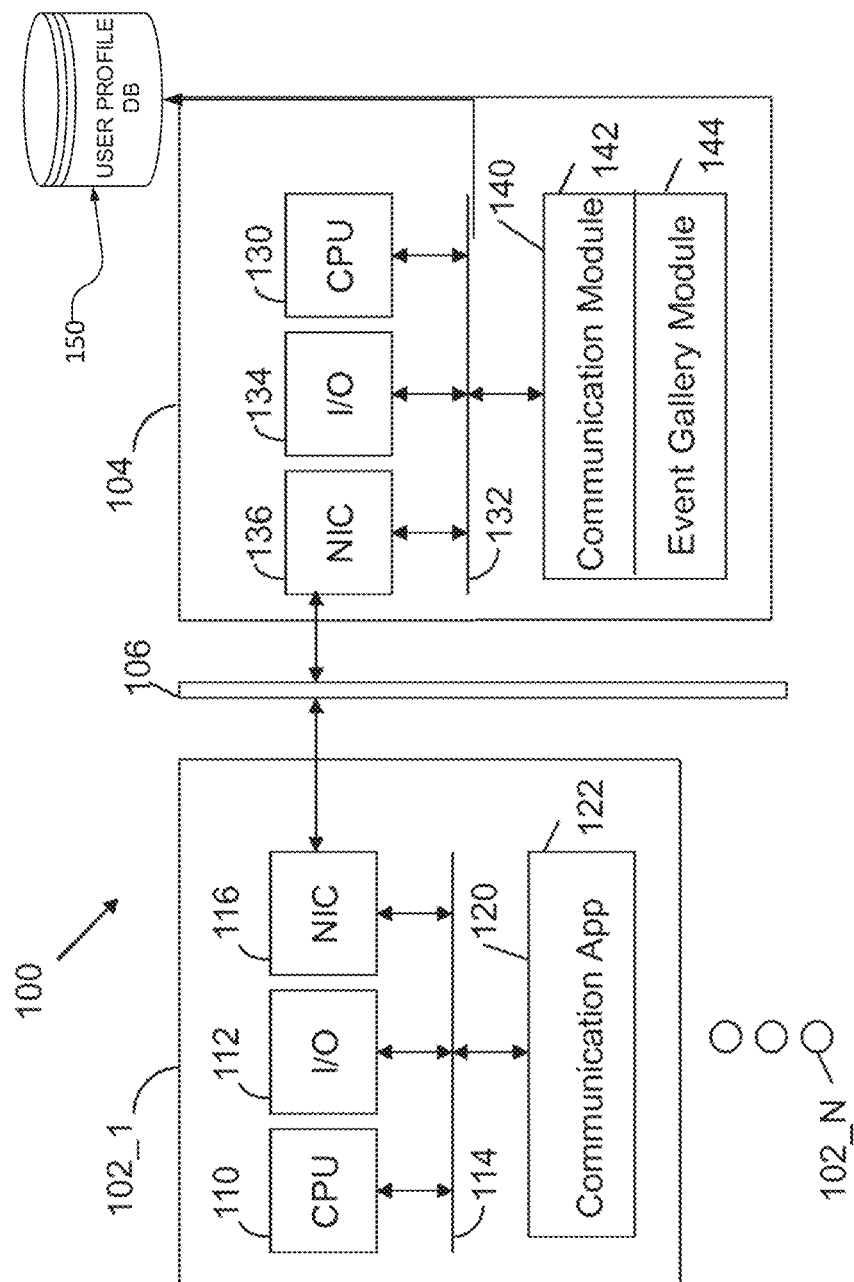
FIG. 1 illustrates a system configured in accordance with an embodiment.

FIG. 1 illustrates a system 100 configured in accordance with an embodiment. The system 100 includes a set of client devices 102_1 through 102_N and at least one server 104 connected via a network 106. The network 106 may be any combination of wired or wireless networks.

Each client device 102 has standard components, such as a central processing unit 110 and input/output devices 112 connected via a bus 114. The input/output devices 112 may include a touch display, dedicated control buttons, physical connectors, speakers and the like. A network interface circuit 116 is also connected to the bus 114 and provides connectivity to network 106. A memory 120 is also connected to the bus 114. A communication application 122 is implemented by CPU 110 to coordinate communications with server 104 and/or other client devices. The client device may be in the form of a tablet, smartphone, wearable technology, laptop computer or desktop computer.

The server 104 also includes standard components, such as a central processing unit 130, a bus 132, input/output devices 134 and a network interface circuit 136. A memory 140 is connected to the bus 132. A communication module 142 is implemented by the CPU 130 to coordinate communications with client devices 102. An event gallery module 144 is implemented by the CPU 130 to store messages from participants in a live event. The messages form an event gallery, which may be supplied to a client device 102 in response to a request from a client device 102. The server 104 also includes or is connected to a database 150 that is accessible via the bus 132 by the communication module 142 and the event gallery module 144. The database 150 may operate as a user profile database and store a user profile table (described in further detail below) used for secondary authentication operations.

Figure 2:
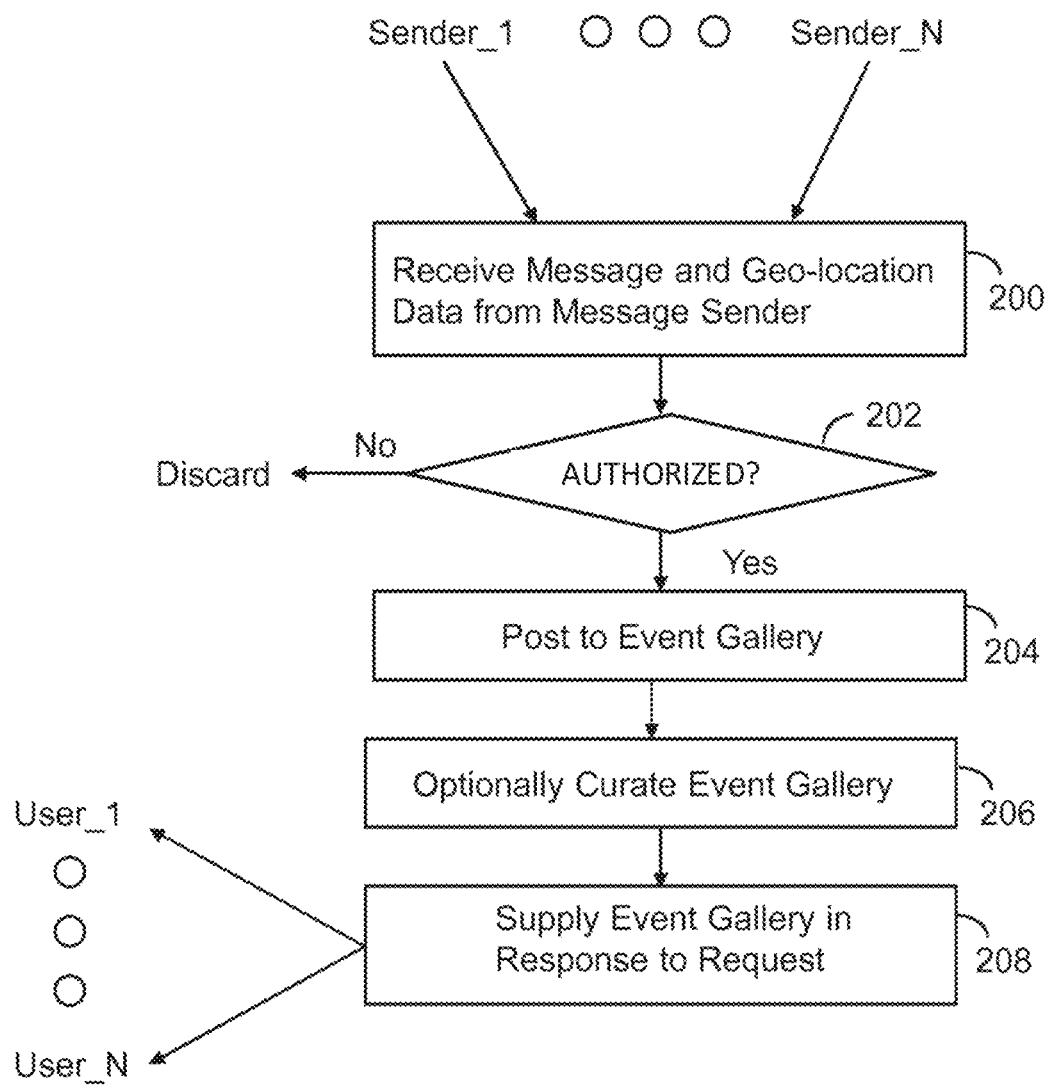
FIG. 2 illustrates server side processing associated with an embodiment.

FIG. 2 illustrates operations associated with an embodiment of the event gallery module 144. The top of the figure illustrates a set of message senders, e.g. Sender_1 through Sender_N. Each message sender is associated with a client device 102. The communication application 122 is configured to accompany a message with geo-location information. Typically, the geo-location information will be collected from a GPS chip resident in the client device. However, other geo-location information may also be used, such as cellular network geo-location information, self-reported geo-location information and the like.

The event gallery module 144 includes an administrative interface that allows one to define an event. For example, the administrative interface may prompt an event planner for event name, event description, event date, event time and event location. The event location is specified in physical coordinates (e.g., GPS coordinates) that define a geo-location fence associated with the event.

As previously indicated, messages from senders include geo-location information. The server 104 receives such messages and geo-location data 200 from any number of senders. For each message, an authorization process (or processes) (202) may be performed to authorize posting of content to an event gallery 204. For example, the geo-location data may be compared to the geo-location fence. If the message was not sent from within the geo-location fence, it is not from a permitted position and it is therefore discarded. If the message is from a permitted position, the message is posted to an event gallery 204. In other example embodiments, secondary authorization processes, as described in further detail below, may be performed in order to assess whether a message is to be posted to an event gallery 204, or alternatively discarded.

The event gallery module 144 may include a curation interface that allows an event planner to optionally curate the event gallery 206. For example, the curation interface may allow the event planner to delete inappropriate or redundant messages. The final operation of FIG. 2 is to supply the event gallery in response to requests 208 from any number of users.

Figure 3:
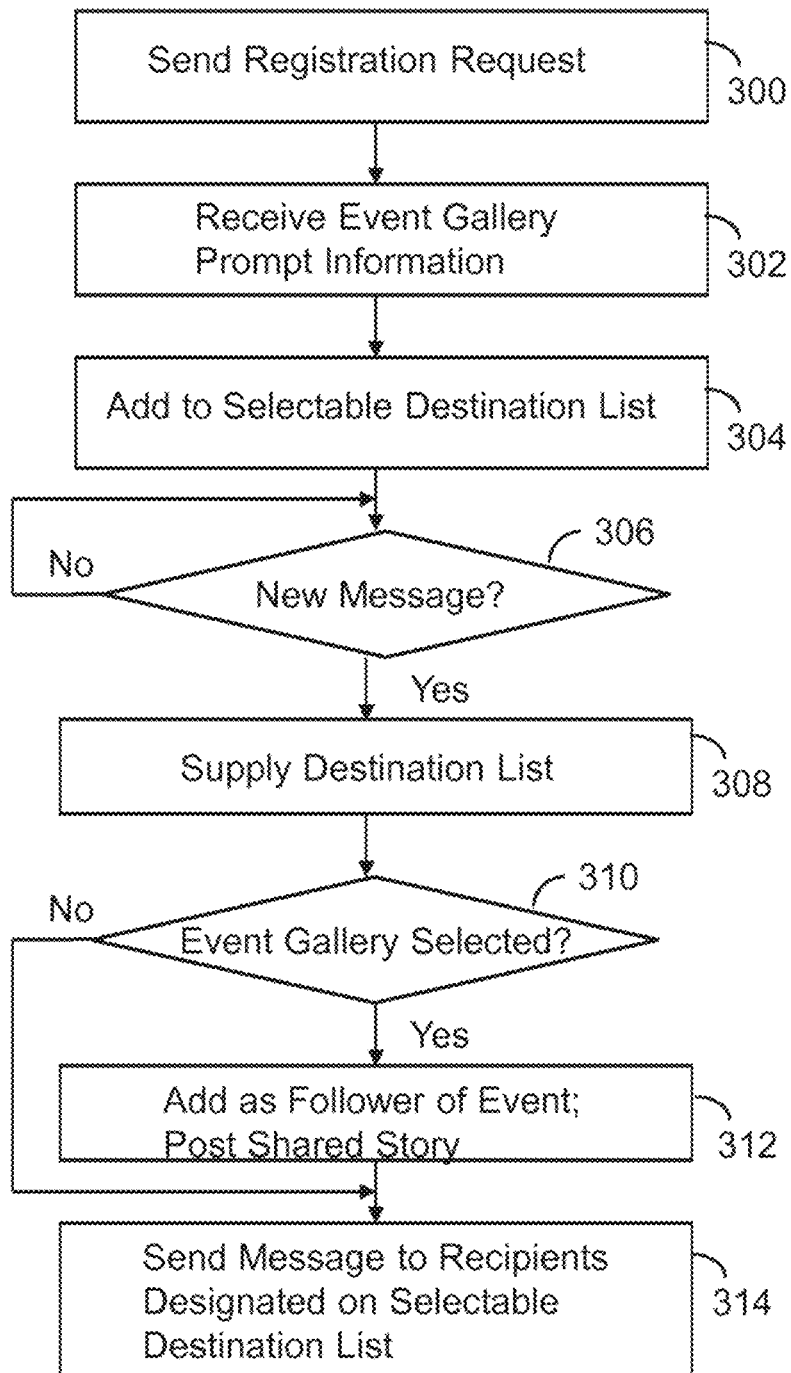
FIG. 3 illustrates client side processing associated with an embodiment.

FIG. 3 illustrates processing associated with the communication application 122 resident on a client device 102. The communication application 122 sends a registration request 300. The registration request may be an explicit request to join or follow an event. Alternately, the registration request may be triggered by sending geo-location data to server 104. The event gallery module 144 determines whether the client device is authorized to register to join or follow the event. For example, the event gallery module 144 may determine whether the geo-location data corresponds to a geo-location fence associated with an event. In other embodiments, secondary authorization processes, as described in further detail below, may be performed in order to assess whether the client device is authorized to join or follow the event.

Event gallery prompt information is received 302 in response to a request. The event gallery prompt information may be indicia of the event, such as a brand, a textual description and the like. The event gallery prompt information is added to a selectable destination list 304 (i.e., a list of recipients for a particular message or piece of content). The selectable destination list 304 includes individuals in a user's social network. In this case, the selectable destination list is augmented with indicia of an event.

If a user generates a message (306—Yes) the destination list is supplied 308. The destination list includes individuals in a user's social network and indicia of the event and/or event gallery. If the event gallery is selected (310), the user is added as a follower of the event 312. So, for example, in the case where the user received the event gallery prompt in response to simply communicating geo-location data, the user may formally follow the event by posting a message (shared story) to the event gallery. That is, the event gallery module 144 adds the user to a list of event followers in response to the user posting a message to the event gallery. Finally, messages are sent to recipients designated on the selectable destination list 314. These recipients may include individuals in the user's social network or have some other association with the user (e.g., common membership within a club, similar hobby, attended the same university, etc.).

Figure 4:
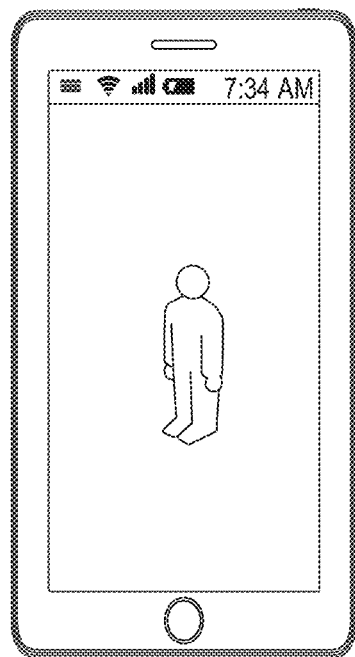
FIGS. 4-8 illustrate graphical user interfaces that may be associated with embodiments.
Figure 5:
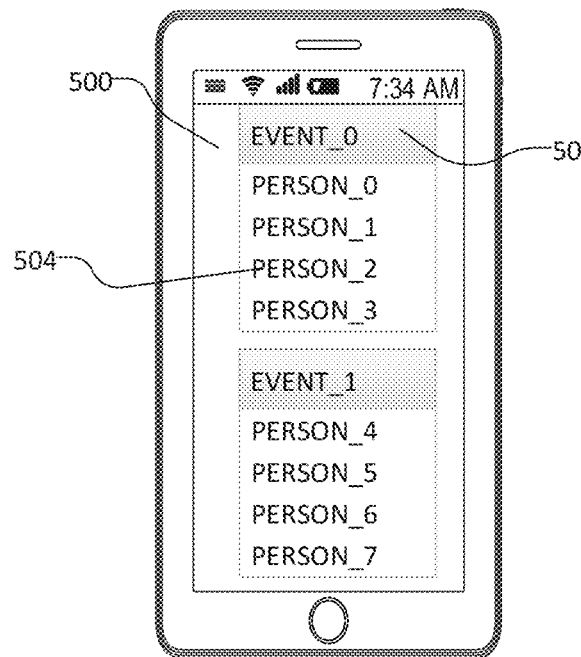
Figure 6:
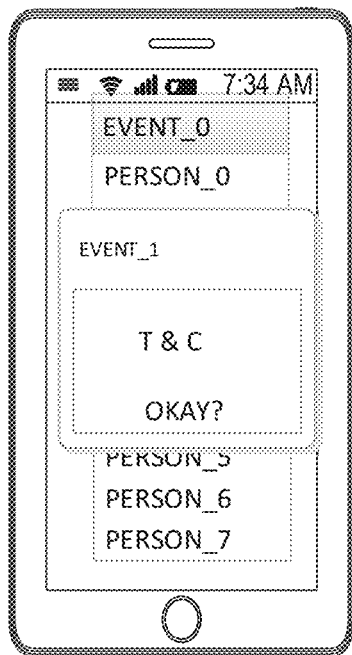
Figure 7:
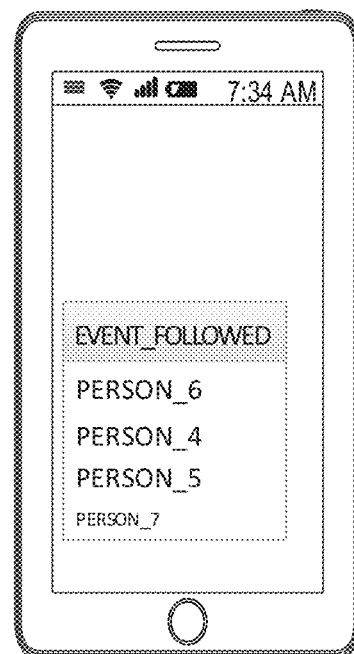

FIG. 4 is an example of a message taken at an event. In this example, the message is a photograph, which may be augmented with text or other graphic. FIG. 5 illustrates a selectable destination list 500. The selectable destination list 500 includes an entry for a live event 502 and entries 504 for individuals in a social network. Selecting the live event 502 (which may have as followers members from the user's social network as well as individuals or entities with no relation to the user) from the selectable destination list 500 may result in a prompt as shown in FIG. 6. The prompt may explain terms associated with posting content to the event gallery. FIG. 7 illustrates an interface listing friends in a social network and one or more events that are being followed.

Figure 8:
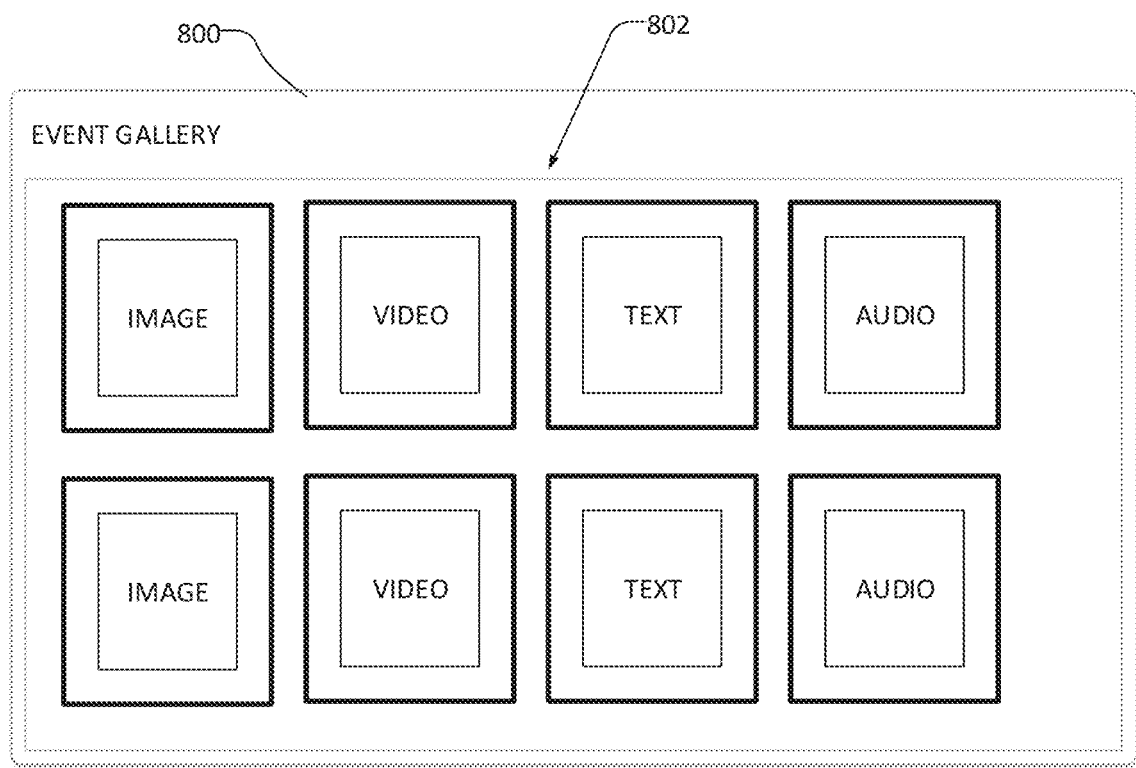

FIG. 8 is an example of an event gallery 800. The event gallery 800 includes individual posted content 802 (e.g., messages including images, video, text and audio). The event gallery 800 may be available for a specified transitory period. For example, the specified transitory period may be the duration of an event. Indicia of the event gallery may appear in a list of friends (e.g., destination list) for the duration of the event. In one embodiment, the event gallery has individual ephemeral messages shown in a sequence. For example, a first image is shown for five seconds, and then a second image is shown for three seconds, etc.

An event gallery may be open to all event participants. Alternately, an event gallery may be formed for a subset of participants selected from a destination list or some other list (e.g., a list of co-workers at an event). An embodiment maintains an ongoing event gallery (shared story) for a geo-location. For example, the shared story may extend over months. Alternately, the shared story may be renewed every twenty-four hour period at a specified geo-location.

Figure 9:
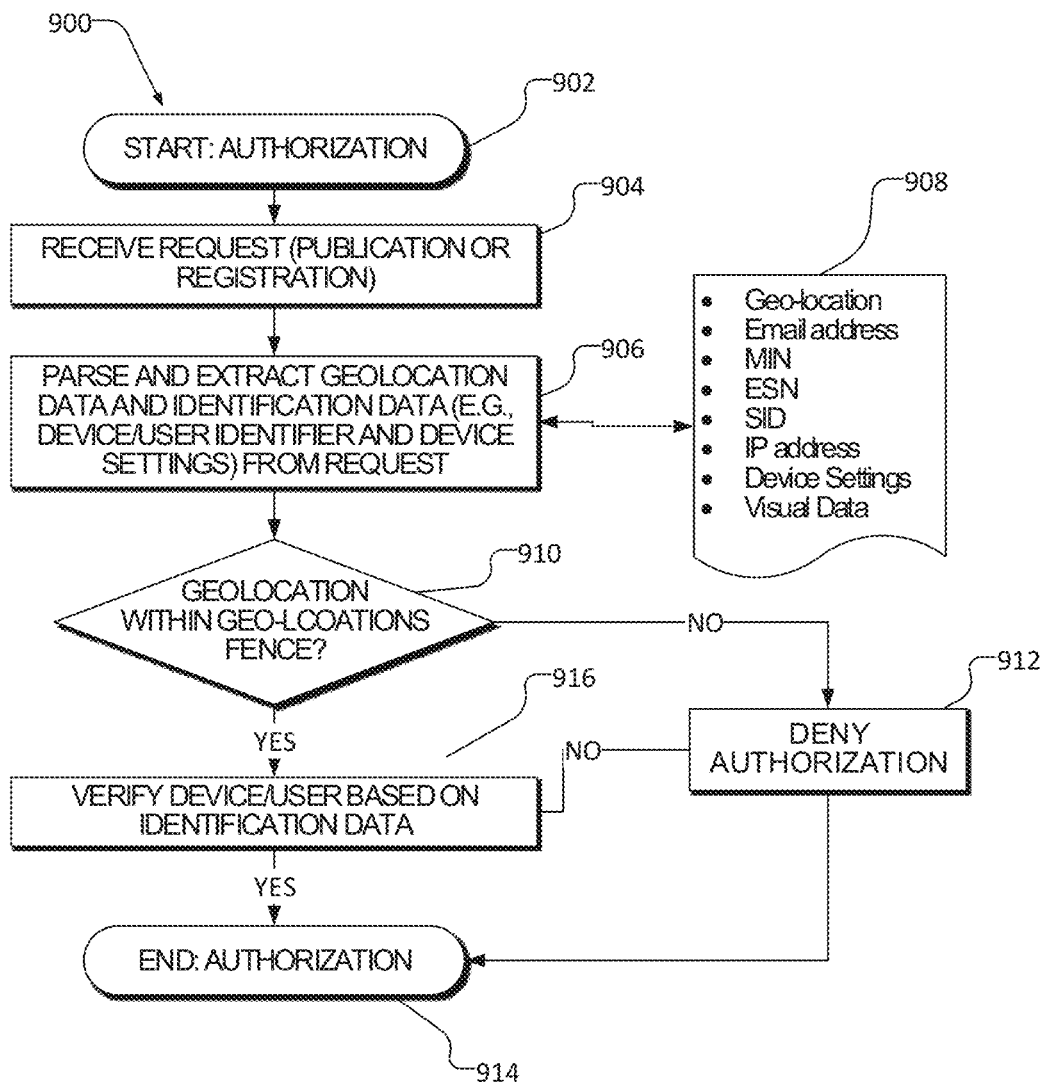
FIG. 9 is a flowchart illustrating a method, according to an example embodiment, of provisioning geo-fence authorization.

FIG. 9 is a flowchart illustrating a method 900, according to an example embodiment, to authorize postings of a message (or other content) to an event gallery. The method 900 may be used to perform authorization or verification operations as part of the operation 202 of FIG. 2 or as part of the registration operation 300 of FIG. 3.

The method 900 commences at operation 902 and is followed by the receipt, at operation 904, of a request from a device to post a message (or other content) to an event gallery, or to register to join or follow an event. The request is received by the communication module 142.

The request to post, join or follow includes geolocation data indicating a location of a requesting device (e.g., a smart phone) from which the request was received, as well as identification data identifying the requesting device or a user operating the requesting device. The geolocation data may, for example, be GPS coordinates provided by a GPS module of a client device 102, or location data determined by the client device 102 using Wi-Fi or cell tower triangulation. The identification data may include an email address of the operator of the client device 102, an identifier of the client device 102 (e.g., an Electronic Serial Number (ESN), a Mobile Identification Number (MIN), or a System Identification Code (SID), a device signature (e.g., generated using the settings of the client device 102), or an IP address of a wireless network via which the request was transmitted. The identification data may also include real-time visual data (e.g., a picture of the face of a sending user or of an environment in which the sending user is located).

At operation 906, the communication module 142 parses the received request, and extracts the geolocation data and identification data. The extracted data 908 is then provided by the communication module 1422 to the event gallery module 144.

At operation 910, the event gallery module 144 performs a first authorization operation, by determining whether the geolocation data, extracted from the request, corresponds to a geolocation fence associated with an event gallery for a specific event or entity. If the geolocation data does not correspond to the relevant geolocation fence, authorization is denied at operation 912, and the method 900 terminates at operation 914.

On the other hand, should the geolocation data correspond to the relevant geolocation fence, the event gallery module 144, at operation 916, performs a second authorization operation that includes using the identification data, extracted at operation 906, to verify an attribute of the user. This second authorization operation is useful for ensuring that only qualified users are able to contribute to the specific event gallery, or to join (or follow) an event for which the event gallery exists. If the second authorization operation fails, authorization is again denied at operation 912. The authorization method 900 terminates at operation 914.

The performance of the second authorization operation may involve any number of sub-operations using, for example, the identification data extracted at operation 906. These various sub operations may be performed against user profile data, stored as part of a user profile table (discussed below with reference to FIG. 10) in the database 150, which is accessed by the event gallery module 144.

In a first example authorization sub-operation, an email address included in the request is used to perform the second authorization. Specifically, the domain name portion of the email address (e.g., john@lmu.edu) may be compared against the domain name of an entity or organization (e.g., Loyola Marymount University) associated with an event. In this example, Loyola Marymount University (LMU) may be the location of a concert event John is seeking to join or follow, or the concert event may have an event gallery to which John is seeking to contribute.

In this sub-operation, the event gallery module 144 may also have access to a database of qualified email addresses for a particular entity or organization. For example, LMU, through agreement with an operator of the system 100, may provide access to a database of authorized email addresses for this university. In a further embodiment, email addresses may be verified against a database of entity email addresses source from a third party (e.g., a social networking site).

In a second example authorization sub-operation, an IP address included in the request may be used to perform the authorization. For example, authorization may be restricted to only those devices posting (or otherwise accessing) from a campus Wi-Fi network, where the relevant event is being hosted on a university campus (or the university is in some other way associated with the event).

Figure 10:
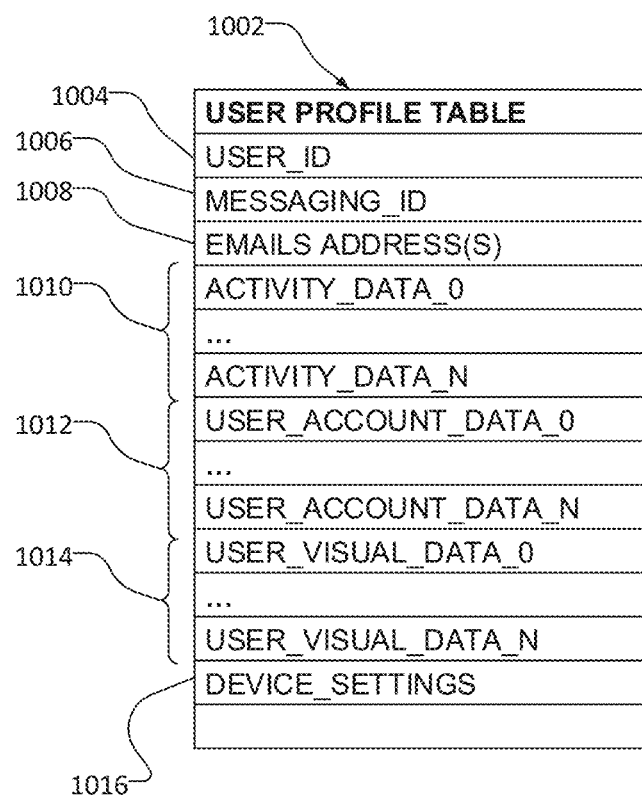
FIG. 10 is a table illustrating a user profile table, according to an example embodiment.

In further example authorization sub-operations, communications, activity and/or visual data included within a user profile is used as part of the second authorization process. FIG. 10 is a data diagram, illustrating an example user profile table 1002 that may be maintained within the database 150. The table 1002 is maintained by a user profile sub module of the event gallery module 144. Turning specifically to the user profile table 1002, the table is shown to include the following information for each user: a user identifier 1004, a messaging system identifier 1006 (e.g., an identifier used by the system 100), one or more email addresses 1008, multiple instances of activity data 1010 (e.g. a user's screen capture behavior or activity, image filter usage etc.), multiple instances of communications (or posting) data 1012 (e.g., contribution history to various event galleries or content collections for events) and multiple instances of user visual data 1014 (e.g., face or location images associated with the user). The user profile table 1002 may also include device setting data 1016. Other examples utilizable information include area code, phone number, etc. For example, the language setting of a user's phone may be a useful criterion for provisioning geo-fence authorization to users in specific countries or regions.

Returning to the description of authorization sub operations using historical activity, communications and/or visual data stored within a user profile table 1002, the following communications data may be used in authorization sub operations:

Recency of contributions to a specific event gallery (e.g., to an event gallery associated with the same (common) entity to which the user is now requesting to provide contributions).

Frequency of sending and receiving communications (e.g., ephemeral messages) to and from other users who have previously contributed to (or who are authorized to contribute to) the relevant event gallery.

Frequency of viewing event galleries (e.g., Snapchat Stories) of another user who previously contributed to a specific event gallery (e.g., an eligible Snapchat Story associated with the same entity (e.g. a university) hosting the event that the user is now seeking to join or follow).

Information or habits regarding a user's friends or contacts activity, including the level of their friends/contacts participation in a specific event gallery. Thus, a user may be granted access to a gallery if a certain number of his or her friends (or phone contacts from his/her device) have participated in posting to the gallery.

Completion of a past event gallery (e.g., access to first and last content items in a gallery sequence), indicating an intimacy or connectedness with an event gallery to which the user may now be seeking access.

Activity data 1010, which provides a history of user activities with respect to a specific application (e.g., the communications application 122) may likewise be used in an authorization sub-operation. Examples of such activity data include data indicating whether a user has applied a image filter (e.g., a Snapchat geo-filter) that is relevant to a particular location or event (e.g., a geo-filter that is associated with a specific university campus), or viewed an image/collection of images to which such a location-relevant image filter has been applied. Similarly, a user's preferences for a particular activity (e.g., a user's hobby), as determined by web browsing or other activity may be used to as well.

The activity data 1010 may also record a user's screen capture (e.g., "screenshotting") behavior or activity on a mobile device, which can also be applied in the authorization sub-operation. Consider that a user may have performed a screen capture operation on a mobile device at a particular location which is within a geo-fence, or sufficiently proximate to a location associated with an event. This information may be computed and used in the authorization sub-operation.

In one example, the user visual data 1014 is used in provisioning geo-fence authorization by determining whether a user's face was previously presented in an approved event gallery. If so, the user's face may be associated with a user account from "selfies" that the user captured using a mobile device or camera. In this example, a real-time-image of a user's face (or data generated from such an image) is included in the request received at operation 904. This real-time image data may be compared against the user visual data 1014 to verify the user, and also compared against images (e.g., selfies) present in another event gallery associated with an authorized entity (e.g., to determine whether a "selfie" depicting the user is present in another Snapchat Story approved for a particular university). If such a correlation is detected, geo-fence authorization may be approved at operation 916.

The device setting data 1016 (e.g., language settings), may also be used as an authorization sub-operation to provision geo-fence authorization in specific regions. For example, where the language settings of a particular device indicate a specific language preference (e.g., German), access to an event gallery for an event occurring in Germany may be selectively authorized based on the determined language preference.

In addition to the examples described above, other concepts are also utilizable as an authorization sub-operation, including express actions required of the user. For example, in some embodiments, a user may be prompted for a password required for access to a gallery.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Applications

Figure 11:
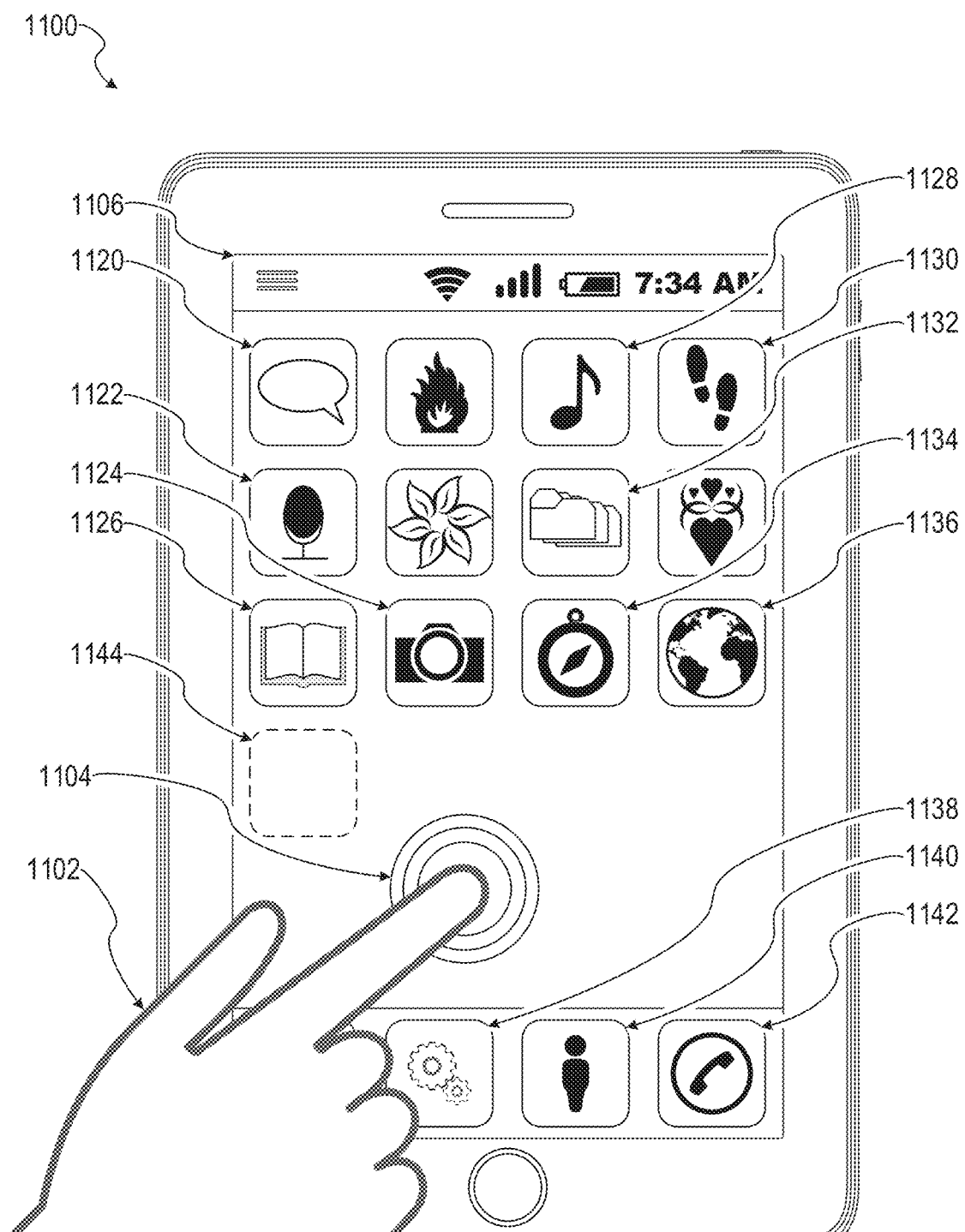
FIG. 11 illustrates an example mobile device that may be executing a mobile operating system, according to an example embodiment.

FIG. 11 illustrates an example mobile device 1100 that may be executing a mobile operating system (e.g., iOS™, Android™, Windows®& Phone, or other mobile operating systems), according to example embodiments. In one embodiment, the mobile device 1100 may include a touch screen that may receive tactile information from a user 1102. For instance, the user 1102 may physically touch 1104 the mobile device 1100, and in response to the touch 1104, the mobile device 1100 may determine tactile information such as touch location, touch force, gesture motion, and so forth. In various example embodiment, the mobile device 1100 may display home screen 1106 (e.g., Springboard on iOS™) that the user 1102 of the mobile device 1100 may use to launch applications and otherwise manage the mobile device 1100. In various example embodiments, the home screen 1106 may provide status information such as battery life, connectivity, or other hardware status. The home screen 1106 may also include a plurality of icons that may be activated to launch applications, for example, by touching the area occupied by the icon. Similarly, other user interface elements may be activated by touching an area occupied by a particular user interface element. In this manner, the user 1102 may interact with the applications.

Many varieties of applications (also referred to as "apps") may be executing on the mobile device 1100. The applications may include native applications (e.g., applications programmed in Objective-C running on iOS™ or applications programmed in Java running on Android™), mobile web applications (e.g., HTML5), or hybrid applications (e.g., a native shell application that launches an HTML5 session). In a specific example, the mobile device 1100 may include a messaging app 1120, audio recording app 1122, a camera app 1124, a book reader app 1126, a media app 1128, a fitness app 1130, a file management app 1132, a location app 1134, a browser app 1136, a settings app 1138, a contacts app 1140, a telephone call app 1142, other apps (e.g., gaming apps, social networking apps, biometric monitoring apps), a third party app 1144, and so forth.

Software Architecture

Figure 12:
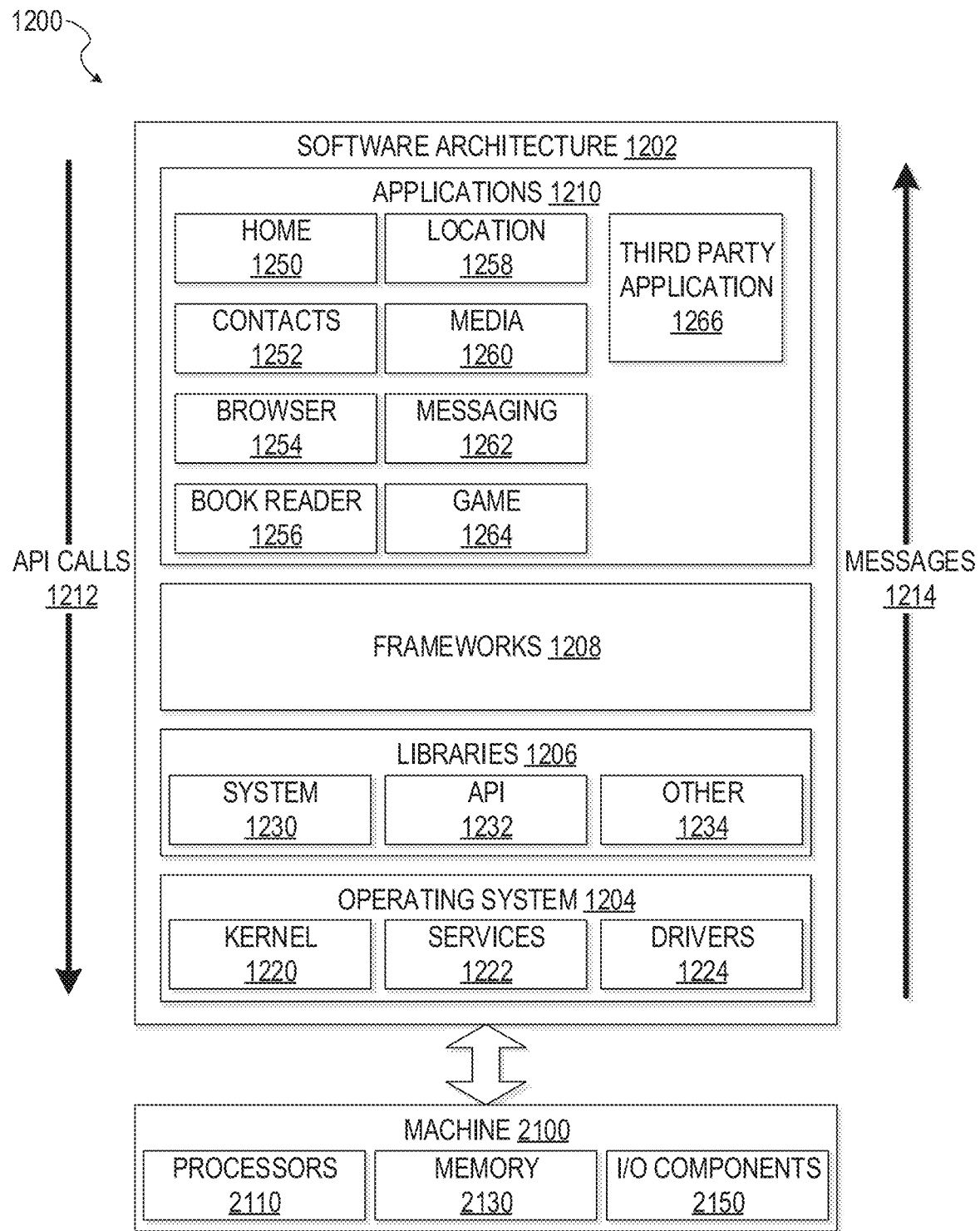
FIG. 12 is a block diagram illustrating architecture of software, which may be installed on any one or more of devices described above.

FIG. 12 is a block diagram 1200 illustrating an architecture of software 1202, which may be installed on any one or more of devices described above. FIG. 12 is merely a non-limiting example of a software architecture and it will be appreciated that many other architectures may be implemented to facilitate the functionality described herein. The software 1202 may be executing on hardware such as machine 1300 of FIG. 13 that includes processors 1310, memory 1330, and I/O components 1350. In the example architecture of FIG. 12, the software 1202 may be conceptualized as a stack of layers where each layer may provide particular functionality. For example, the software 1202 may include layers such as an operating system 1204, libraries 1206, frameworks 1208, and applications 1210. Operationally, the applications 1210 may invoke application programming interface (API) calls 1212 through the software stack and receive messages 1214 in response to the API calls 1212.

The operating system 1204 may manage hardware resources and provide common services. The operating system 1204 may include, for example, a kernel 1220, services 1222, and drivers 1224. The kernel 1220 may act as an abstraction layer between the hardware and the other software layers. For example, the kernel 1220 may be responsible for memory management, processor management (e.g., scheduling), component management, networking, security settings, and so on. The services 1222 may provide other common services for the other software layers. The drivers 1224 may be responsible for controlling or interfacing with the underlying hardware. For instance, the drivers 1224 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 1206 may provide a low-level common infrastructure that may be utilized by the applications 1210. The libraries 1206 may include system 1230 libraries (e.g., C standard library) that may provide functions such as memory allocation functions, string manipulation functions, mathematic functions, and the like. In addition, the libraries 1206 may include API libraries 1232 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1206 may also include a wide variety of other libraries 1234 to provide many other APIs to the applications 1210.

The frameworks 1208 may provide a high-level common infrastructure that may be utilized by the applications 1210. For example, the frameworks 1208 may provide various graphic user interface (GUI) functions, high-level resource management, high-level location services, and so forth. The frameworks 1208 may provide a broad spectrum of other APIs that may be utilized by the applications 1210, some of which may be specific to a particular operating system or platform.

The applications 1210 include a home application 1250, a contacts application 1252, a browser application 1254, a book reader application 1256, a location application 1258, a media application 1260, a messaging application 1262, a game application 1264, and a broad assortment of other applications such as third party application 1266. In a specific example, the third party application 1266 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1266 may invoke the API calls 1212 provided by the mobile operating system 1204 to facilitate functionality described herein.

Example Machine Architecture and Machine-Readable Medium

Figure 13:
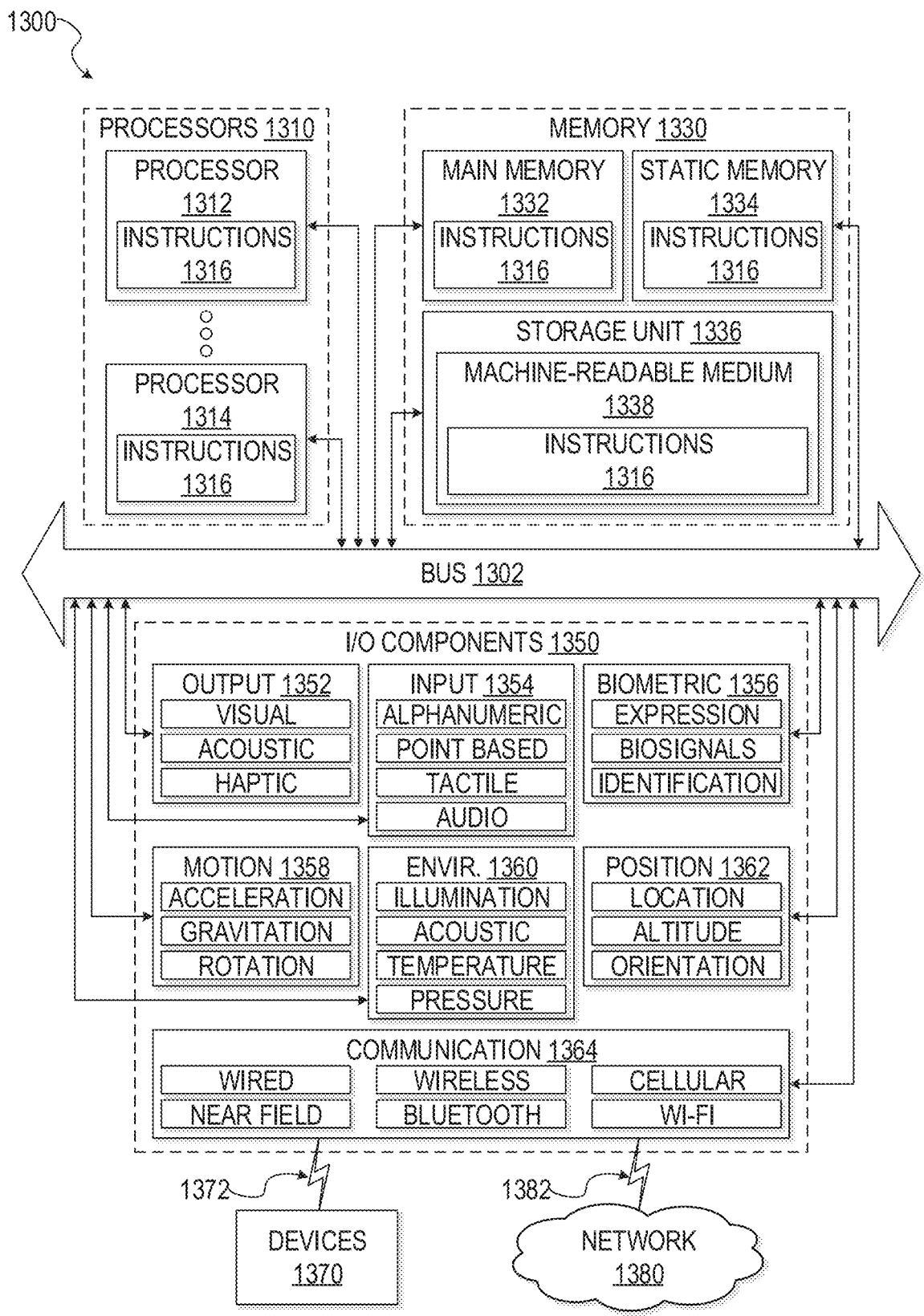
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1312 and processor 1314 that may execute instructions 1316. The term "processor" is intended to include multi-core processor that may comprise two or more independent processors (also referred to as "cores") that may execute instructions contemporaneously. Although FIG. 13 shows multiple processors, the machine 1300 may include a single processor with a single core, a single processor with multiple cores (e.g., a multi-core process), multiple processors with a single core, multiple processors with multiples cores, or any combination thereof.

The memory 1330 may include a main memory 1332, a static memory 1334, and a storage unit 1336 accessible to the processors 1310 via the bus 1302. The storage unit 1336 may include a machine-readable medium 1338 on which is stored the instructions 1316 embodying any one or more of the methodologies or functions described herein. The instructions 1316 may also reside, completely or at least partially, within the main memory 1332, within the static memory 1334, within at least one of the processors 1310 (e.g., within the processor's cache memory), or any suitable combination thereof, during execution thereof by the machine 1300. Accordingly, the main memory 1332, static memory 1334, and the processors 1310 may be considered as machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 may include a wide variety of components to receive input, provide output, produce output, transmit information, exchange information, capture measurements, and so on. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In further example embodiments, the I/O components 1350 may include biometric components 1356, motion components 1358, environmental components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via coupling 1382 and coupling 1372 respectively. For example, the communication components 1364 may include a network interface component or other suitable device to interface with the network 1380. In further examples, communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1364, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or other type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to devices 1370. The term "transmission medium" shall be taken to include any intangible medium that is capable of storing, encoding, or carrying instructions 1316 for execution by the machine 1300, and includes digital or analog communications signals or other intangible medium to facilitate communication of such software.

Furthermore, the machine-readable medium 1338 is non-transitory (in other words, not having any transitory signals) in that it does not embody a propagating signal. However, labeling the machine-readable medium 1338 as "non-transitory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer implemented method, comprising:
receiving a request to post content to an event gallery associated with an event, the request comprising:
geo-location data that describes a particular location of a device; and
identification data identifying at least one of the device or a user of the device;
performing a first authorization operation including determining that the particular location is within a geo-location fence associated with the event;
performing a second authorization operation including using the identification data to verify an attribute of the user, the verifying the attribute of the user comprising using a history of user activities with respect to a software application on the device to identify application of an image filter to an image on the device, the image filter being relevant to the particular location; and
based on the first and second authorization operations, posting the content to the event gallery.

2. The computer implemented method of claim 1, wherein the identification data comprises an IP address, and the second authorization operation comprises verifying that the IP address relates to an organization associated with the event.

3. The computer implemented method of claim 1, further comprising locating a user profile, associated with the user, stored in a database, wherein the second authorization operation includes extracting the history of user activities from the user profile in the database in order to verify the attribute of the user.

4. The computer implemented method of claim 1, wherein the identification data includes real-time visual data captured using the device, the attribute of the user comprises a user visual attribute, the verifying the attribute of the user comprises comparing visual data of user profile data with the real-time visual data, and the user profile data is associated with the user.

5. The computer implemented method of claim 1, wherein the verifying the attribute of the user comprises identifying at least one communication with a further user, the further user having made at least one communications contribution to a further event gallery associated with a further event.

6. The computer implemented method of claim 5, wherein the event and the further event are both related to a common entity.

7. The computer implemented method of claim 1, wherein the attribute of the user comprises a user activity attribute.

8. The computer implemented method of claim 1, wherein the event gallery is available for a specified transitory period.

9. The computer implemented method of claim 1, wherein the event gallery comprises individual ephemeral messages shown in sequence.

10. A system comprising:
at least one processor; and
at least one memory storing instructions that, when executed by the at least one processor, cause the processor to perform operations comprising:
receiving a request to post content to an event gallery associated with an event, the request comprising:
geo-location data that describes a particular location of a device; and
identification data identifying at least one of the device or a user of the device;
performing a first authorization operation including determining that the particular location is within a geo-location fence associated with the event;
performing a second authorization operation including using the identification data to verify an attribute of the user, the verifying the attribute of the user comprising using a history of user activities with respect to a software application on the device to identify application of an image filter to an image on the device, the image filter being relevant to the particular location; and
based on the first and second authorization operations, posting the content to the event gallery.

11. The system of claim 10, wherein the identification data comprises an IP address, and the second authorization operation comprises verifying that the IP address relates to an organization associated with the event.

12. The system of claim 10, wherein the operations further comprise locating a user profile, associated with the user, stored in a database, and wherein the second authorization operation includes extracting the history of user activities from the user profile in the database in order to verify the attribute of the user.

13. The system of claim 10, wherein the identification data includes real-time visual data captured using the device, the attribute of the user comprises a user visual attribute, the verifying the attribute of the user comprises comparing visual data of user profile data with the real-time visual data, and the user profile data is associated with the user.

14. The system of claim 10, wherein the verifying the attribute of the user comprises identifying at least one communication with a further user, the further user having made at least one communications contribution to a further event gallery associated with a further event.

15. The system of claim 14, wherein the event and the further event are both related to a common entity.

16. The system of claim 10, wherein the attribute of the user comprises a user activity attribute.

17. The system of claim 10, wherein the event gallery is available for a specified transitory period.

18. The system of claim 10, wherein the event gallery comprises individual ephemeral messages shown in sequence.

19. A system comprising:
a communication component, implemented using at least one processor, to receive a request to post content to an event gallery associated with an event, the request comprising:
geo-location data that describes a particular location of a device; and
identification data identifying at least one of the device or a user of the device; and
an event gallery component to:
perform a first authorization operation including determining that the particular location is within a geo-location fence associated with the event;
perform a second authorization operation including using the identification data to verify an attribute of the user, the verifying the attribute of the user comprising using a history of user activities with respect to a software application on the device to identify application of an image filter to an image on the device, the image filter being relevant to the particular location; and
based on the first and second authorization operations, post the content to the event gallery.

20. The system of claim 19, wherein the identification data includes real-time visual data captured using the device, the attribute of the user comprises a user visual attribute, the verifying the attribute of the user comprises comparing visual data of user profile data with the real-time visual data, and the user profile data is associated with the user.

* * * * *